(12) United States Patent
Vanderspurt et al.

(10) Patent No.: US 7,612,011 B2
(45) Date of Patent: *Nov. 3, 2009

(54) CERIA-BASED MIXED-METAL OXIDE STRUCTURE, INCLUDING METHOD OF MAKING AND USE

(75) Inventors: Thomas Henry Vanderspurt, Glastonbury, CT (US); Fabienne Wijzen, Beaufays (BE); Xia Tang, West Hartford, CT (US); Miriam P. Leffler, Manchester, CT (US); Rhonda R. Willigan, Manchester, CT (US); Caroline A. Newman, Cromwell, CT (US); Rakesh Radhakrishnan, Vernon, CT (US); Fangxia Feng, Richardson, TX (US); Bruce Leon Laube, South Windsor, CT (US); Zissis Dardas, Worcester, MA (US); Susanne M. Opalka, Glastonbury, CT (US); Ying She, Worcester, MA (US)

(73) Assignee: UTC Power Corporation, South Windsor, CT (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/605,515

(22) Filed: Nov. 28, 2006

(65) Prior Publication Data
US 2007/0093382 A1 Apr. 26, 2007

Related U.S. Application Data

(60) Division of application No. 10/402,808, filed on Mar. 28, 2003, now Pat. No. 7,166,263, which is a continuation-in-part of application No. 10/109,161, filed on Mar. 28, 2002, now abandoned.

(51) Int. Cl.
C01F 17/00 (2006.01)
(52) U.S. Cl. .......................... 502/302; 502/303; 502/304
(58) Field of Classification Search .............. 502/302, 502/303, 304; 423/656, 247
See application file for complete search history.

(56) References Cited

U.S. PATENT DOCUMENTS

| | | | | |
|---|---|---|---|---|
| 3,565,830 A | 2/1971 | Keith et al. | ................. | 252/466 |
| 3,825,501 A | 7/1974 | Muenger | ................... | 252/373 |
| 3,870,455 A | 3/1975 | Hindin | ........................ | 431/7 |
| 4,021,366 A | 5/1977 | Robin et al. | ................. | 252/373 |
| 4,157,316 A | 6/1979 | Thompson et al. | .......... | 252/462 |
| 4,585,752 A | 4/1986 | Ernest | ........................ | 502/314 |
| 4,587,231 A | 5/1986 | Sawamura et al. | .......... | 502/304 |
| 4,629,612 A | 12/1986 | van der Wal et al. | ........ | 423/244 |
| 4,835,132 A | 5/1989 | Sambrook | ................... | 502/303 |
| 4,868,148 A | 9/1989 | Henk et al. | ................. | 502/303 |
| 5,464,606 A | 11/1995 | Buswell et al. | ............. | 423/655 |
| 5,480,854 A | 1/1996 | Rajaram et al. | ............. | 502/304 |
| 5,490,977 A | 2/1996 | Wan et al. | ................... | 423/210 |
| 5,491,120 A | 2/1996 | Voss et al. | .................. | 502/304 |
| 5,492,878 A | 2/1996 | Fujii et al. | ................... | 502/304 |
| 5,895,772 A | 4/1999 | Grigorova et al. | ........... | 502/304 |
| 5,945,369 A | 8/1999 | Kimura et al. | ............... | 502/304 |
| 5,948,683 A | 9/1999 | Koermer et al. | ............... | 436/37 |
| 5,990,040 A | 11/1999 | Hu et al. | ...................... | 502/342 |
| 6,033,634 A | 3/2000 | Koga | ........................... | 422/198 |
| 6,204,219 B1 | 3/2001 | Brezny et al. | ............... | 502/304 |
| 6,299,994 B1 | 10/2001 | Towler et al. | ................. | 429/17 |

(Continued)

FOREIGN PATENT DOCUMENTS

EP 0298351 1/1989

(Continued)

OTHER PUBLICATIONS

S. Hilaire, "A comparative study of water-gas shift reaction over ceria supported metallic catalysts", Applied Catalysis A: General 215 (2001), pp. 271-278.

(Continued)

*Primary Examiner*—Steven Bos
(74) *Attorney, Agent, or Firm*—Stephen A. Schneeberger

(57) ABSTRACT

A homogeneous ceria-based mixed-metal oxide, useful as a catalyst support, a co-catalyst and/or a getter has a relatively large surface area per weight, typically exceeding 150 $m^2/g$, a structure of nanocrystallites having diameters of less than 4 nm, and including pores larger than the nanocrystallites and having diameters in the range of 4 to about 9 nm. The ratio of pore volumes, $V_P$, to skeletal structure volumes, $V_S$, is typically less than about 2.5, and the surface area per unit volume of the oxide material is greater than 320 $m^2/cm^3$, for low internal mass transfer resistance and large effective surface area for reaction activity. The mixed metal oxide is ceria-based, includes Zr and or Hf, and is made by a novel co-precipitation process. A highly dispersed catalyst metal, typically a noble metal such as Pt, may be loaded on to the mixed metal oxide support from a catalyst metal-containing solution following a selected acid surface treatment of the oxide support. Appropriate ratioing of the Ce and other metal constituents of the oxide support contribute to it retaining in a cubic phase and enhancing catalytic performance. Rhenium is preferably further loaded on to the mixed-metal oxide support and passivated, to increase the activity of the catalyst. The metal-loaded mixed-metal oxide catalyst is applied particularly in water gas shift reactions as associated with fuel processing systems, as for fuel cells.

23 Claims, 8 Drawing Sheets

U.S. PATENT DOCUMENTS

| | | | |
|---|---|---|---|
| 6,322,917 B1 | 11/2001 | Acker | 429/17 |
| 6,326,329 B1 | 12/2001 | Nunan | 502/242 |
| 6,409,939 B1 | 6/2002 | Abdo et al. | 252/373 |
| 6,455,182 B1 * | 9/2002 | Silver | 429/17 |
| 6,777,117 B1 * | 8/2004 | Igarashi et al. | 429/19 |
| 2003/0186804 A1 * | 10/2003 | Wagner et al. | 502/300 |

FOREIGN PATENT DOCUMENTS

| | | |
|---|---|---|
| EP | 1 046 612 A1 | 10/2000 |
| EP | 1 256 545 A1 | 7/2001 |
| EP | 1 161 991 A1 | 12/2001 |
| JP | 10202101 | 8/1998 |
| JP | 1133294 | 12/1999 |
| WO | WO 96/23573 | 8/1996 |
| WO | WO 97/44123 | 11/1997 |
| WO | WO 01/03828 | 1/2001 |

OTHER PUBLICATIONS

Qi Fu, "Nanostructured Au-CeO2 catalysts for low-temperature water-gas shift", Catalysis Letters, vol. 77, No. 1-3, (2001), pp. 87-95.

Yue Li, et al, "Low-temperature water-gas shift reaction over Cu- and Ni-loaded cerium oxide catalysts," Applied Catalysis B: Environmental 27(2000), pp. 179-191.

A. Martinez-Arias, et al: "EPR study on oxygen handling properties of ceria, zirconia, and Zr-Ce (1:1) mixed oxide samples", Catalysis Letters, 65 (2000), pp. 197-204.

E. S. Putna, et al, "Ceria films on zirconia substrates: models for understanding oxygen storage properties", Catalysis Today, 50 (1999), pp. 343-352.

Paolo Fornasiero, et al, "On the rate determining step in the reduction of CeO2-ZrO2 mixed oxides", Applied Catalysis B: Environmental, 22 (1999), pp. L11-L14.

Rossignol, et al, "Preparation of zirconia-ceria materials by soft chemistry", Catalysis Today, 50 (1999), pp. 261-270.

T. Bunluesin, et al, "Studies of the water-gas shift reaction on ceria-supported Pt, Pd, and Rh: implications for oxygen storage properties", Applied Catalysis, B: Environmental, (1998), pp. 107-114.

G. Colon, et al, "Surface and structural characterization of CeZr1-xO2 Cezirencat mixed oxides as potential three-way catalyst promoters", J. Chem. Soc., Faraday Trans., 94 (1998), pp. 3717-3726.

O. A. Kirichenko, et al, "Effect of coprecipitation conditions on the surface area, phase composition, and reducibility of Ce2-ZrO2-Y2O3 materials for automotive three-way catalysts", Preparation of Catalysts VII, B. Delmon, et al, editors, (1998), pp. 411-420.

Carla E. Hori, et al, "Thermal stability of oxygen storage properties in a mixed CeO2-ZrO2 system", Applied Catalysis B: Environmental, 16 (1998), pp. 105-111.

Lj. Kundakovic, et al, "Cu- and Ag-modified cerium oxide catalysts for methane oxidation", Journal of Catalysis 179 (1998), pp. 203-221.

DanielaTerribile, et al, "The preparation of high surface area CeO2-ZrO2 mixed oxides by a surfactant-assisted approach", Catalysis Today, 43.

Lj. Kundakovic, et al, "Reduction characteristics of copper oxide in cerium and zirconium oxide systems", Applied Catalysis A: General, 171 (1998), pp. 13-29.

G. Vlaic, et al, "Relationship between the zirconia-promoted reduction in the Rh-loaded Ce0.5Zr0.5O2 mixed oxide and the Zr-O local structure", Journal of Catalysis 168 (1997), pp. 386-392.

Polona Vidmar, et al, "Effects of trivalent dopants on the redox properties of Ce0.6Zr0.4O2 mixed oxide", Journal of Catalysis 171 (1997), pp. 160-168.

H. Cordatos, et at "Effect of ceria structure on oxygen migration for Rh/ceria catalysts", J. of Physical Chemistry, (1996) 100, pp. 785-789.

P. Fornasiero, et al, "Modification of the redox behaviour of CeO2 induced by structural doping with ZrO2", J. of Catalysis 164 (1996), pp. 173-183.

Yuhan Sun, et al, "Importance of homogeneity in the stabilisation of high surface area CeO2-ZrO2 aerogels", J. of Material Chemistry 6(6) (1996), pp. 1025-1029.

P. Fornasiero, et al, "Rh-loaded CeO2-ZrO2 solid solutions as highly eficient oxygen exchangers: dependence of the reduction behavior and the oxygen storage capacity on the structural properties", J. of Catalysis 151 (1995), pp. 168-177.

Luccini, E. et al, "Preparation of Zirconia-Ceria Powders by Coprecipitation . . . With Urea", Int. J. Materials and Product Technology, vol. 4, No. 2, 1989, pp. 167-175.

S. Pengpanich, et al, "Catalytic oxidationof methane over CeO2-ZrO2 mixed oxide solid solution catalysts prepared via urea hydrolysis", Applied Catalysis A: general 234 (2002) 221-233 (no month).

Jyung-Dong Lin, et at "Coprecipitation and Hydrothermal Synthesis of ultrafine 5.5 mol% CeO2-2 mol% YO1.5-ZrO2 Powders", Jan. 1997, J. Am. Ceram. Soc. 80 [1] pp. 92-98.

* cited by examiner ized as desirable in other, lower temperature,
CERIA-BASED MIXED-METAL OXIDE STRUCTURE, INCLUDING METHOD OF MAKING AND USE This application is a division of U. S. patent application Ser. No. 10/402,808 filed Mar. 28, 2003 now U.S. Pat. No. 7,166,263, which in turn is a continuation-in-part of U. S. patent application Ser. No. 10/109,161 filed Mar. 28, 2002 now abandoned.

TECHNICAL FIELD

This invention relates to mixed metal oxides, and more particularly to ceria-based mixed-metal oxide structures, for use as catalyst supports, as co-catalysts, as getters, and the like. The invention relates further to methods of preparing such ceria-based mixed-metal oxide structures, and further still to metal loading of such structures. The invention relates still further to the application of such mixed-metal oxide structures as catalyst supports, co-catalysts, and/or getters in, for instance, fuel processing systems.

BACKGROUND ART

Various metal oxides have found use in chemically reactive systems as catalysts, supports for catalysts, gettering agents and the like. As used herein, a gettering agent, or getter, is a substance that sorbs or chemically binds with a deleterious or unwanted impurity, such as sulfur. In those usages, their chemical characteristics and morphologies may be important, as well as their ease and economy of manufacture. One area of usage that is of particular interest is in fuel processing systems. Fuel processing systems catalytically convert hydrocarbons into hydrogen-rich fuel streams by reaction with water and oxygen. The conversion of carbon monoxide and water into carbon dioxide and hydrogen through the water gas shift (WGS) reaction is an essential step in these systems. Preferential oxidation (PROX) of the WGS product using such catalysts may also be part of the process, as in providing hydrogen fuel for a fuel cell. Industrially, copper-zinc oxide catalysts, often containing alumina and other products, are effective low temperature shift catalysts. These catalysts are less desirable for use in fuel processing systems because they require careful reductive activation and can be irreversibly damaged by air after activation.

Recent studies of automotive exhaust gas "three-way" catalysts (TWC) have described the effectiveness of a component of such catalysts, that being noble metal on cerium oxide, or "ceria" ($CeO_2$), for the water gas shift reaction because of its particular oxygen storing capacity (OSC). Indeed, the ceria may even act as a "co-catalyst" with the noble metal loading in that it, under reducing conditions, acts in concert with the noble metal, providing oxygen from the $CeO_2$ lattice to the noble metal surface to oxidize carbon monoxide and/or hydrocarbons adsorbed and activated on the surface. In many cases the ceria component of these catalysts is not pure ceria, but cerium oxide mixed with zirconium oxide and optionally, other oxides such as rare earth oxides. It has been determined that the reduction/oxidation (redox) behavior of the cerium oxide is enhanced by the presence of $ZrO_2$ and/or selected dopants. Robustness at high temperatures is an essential property of TWC's, and thus, such catalysts do not typically have either sustainable high surface areas, i. e., greater than 100 $m^2/g$, or high metal dispersion (very small metal crystallites), even though such features are generally recognized as desirable in other, lower temperature, catalytic applications.

For mixed-metal oxides that are to be used as such catalyst supports and which comprise cerium oxide and zirconium and/or hafnium oxide, it is generally desirable that they possess a cubic structure. The cubic structure is generally associated with greater oxygen mobility, and therefore greater catalytic activity. Moreover, the zirconium and/or hafnium provide thermal stability, and thus contribute to the thermal stability and life of a catalyst. Yashima et al., in an article entitled "Diffusionless Tetragonal-Cubic Transformation Temperature in Zirconia Solid Solution" in Journal of American Ceramic Society, 76 [11], 1993, pages 2865-2868, have recently shown that cubic ceria undergoes a phase transition to tetragonal when doping levels of zirconia are at or above 20 atomic percent. They suggest that above 20 percent zirconia, the oxygen anion lattice distorts into a tetragonal phase, while the cerium and zirconium cations remain in a cubic lattice structure, creating a non-cubic, metastable, pseudo-tetragonal phase lattice. Traditionally, powder X-ray diffraction (PXRD) is used to identify the structure and symmetry of such phases. However, in the case of ceria-zirconia oxides with very small crystallite sizes (i.e., less than 3 nm), the PXRD signal exhibits broadened peaks. Additionally, the signal produced by the oxygen atoms, which is a function of atomic weight, is drowned out by the intense signal produced by the cerium and zirconium cations. Thus any tetragonal distortion, caused by the oxygen atoms shifting in the lattice, goes unnoticed in a PXRD pattern and the resulting pattern appears cubic. In such cases, Raman spectroscopy and X-ray absorption fine structure (EXAFS) can be employed to observe such phase transitions. Yashima et al. have published Raman spectroscopy and EXAFS studies in support of the position taken above. Vlaic et al., in an article entitled "Relationship between the Zirconia-Promoted Reduction in the Rh-Loaded $Ce_{0.5}Zr_{0.5}O_2$ Mixed Oxide and the Zr—O Local Structure" in Journal of Catalysis, 168, (1997) pages 386-392, have shown similar results for a phase transition at 50% zirconia, as determined by Raman spectroscopy and EXAFS.

Ceria-zirconia mixed oxide materials having relatively large surface areas per unit weight may be particularly well suited in various catalytic and/or gettering (i.e., sulfur sorbing) applications, as might be typified by, but not limited to, the WGS reaction. Indeed, such ceria-based mixed metal oxides may be used first in a WGS system as a getter to adsorb sulfur-containing compounds from the gas stream to protect more sensitive/valuable components downstream that use such oxides as catalysts in the WGS reaction. In that general regard, it is deemed desirable that the mixed oxide material be comprised of small crystallites agglomerated to form porous particles having relatively large surface areas per unit weight as a result of-significant pore diameters and pore volumes. Large pore diameters facilitate mass transfer during catalytic reactions or gettering applications, by minimizing mass transfer resistance. On the other hand, excessive pore volumes may act to minimize the amount of effective surface area in a given reactor volume, for a given final form of catalyst or getter, thereby limiting the catalytic or gettering action in a given reactor volume. Thus, the ratio of pore volume to the structural mass, as well as crystallite size and pore diameters, can be optimized within a range. In this regard then, the particular morphology of the ceria-based mixed-metal oxide material becomes important for efficient operation of the material as a catalyst or getter in particular reactions and/or under particular operating conditions and geometries.

A variety of synthesis techniques have been used to provide ceria-zirconia mixed oxide materials. These techniques include conventional co-precipitation, homogeneous coprecipitation, the citrate process, and a variety of sol-gel techniques. However, as far as can be determined, the surface areas of the mixed metal oxides resulting from these techniques are typically less than about 130 m²/g. Liquid phase synthesis at relatively low temperatures is preferred, as it allows for the formation of metastable phases and offers the ability to control such properties as surface area, particle size, and pore structure. Typical solution routes have involved two steps, hydration and condensation. It has been generally accepted that the gel matrix formed upon hydration is amorphous and only forms a crystalline structure when the framework undergoes condensation. While hydration occurs at the moment the gelatinous phase is formed from solution, condensation has usually been expected to occur during the aging (maturing), drying and/or calcinations steps. For many mixed metal oxide systems, the detailed conditions under which these steps (such as aging) occur are, and have been, critical parameters in determining the properties of the final product. Thus, a time consuming step such as aging has been essential.

Surface areas as great as 235 m²/g for such materials have been reported by D Terribile, et al, in an article entitled "The preparation of high surface area CeO2-ZrO2 mixed oxides by a surfactant-assisted approach" appearing in *Catalysis Today* 43 (1998) at pages 79-88, however, the process for their production is complex, sensitive, and time-consuming. The process for making these oxides requires the use of a surfactant and a lengthy aging, or maturing, interval of about 90 hours at 90° C. Moreover, the initial precipitate must be washed repeatedly with water and acetone to remove the free surfactant (cetyltrimethylammonium bromide) before the material can be calcined, thereby contributing to delays and possible other concerns. Still further, the mean particle sizes of these oxides appear to be at least 4-6 nm or more. The pore volume is stated to be about 0.66 cm³/g. This relatively large pore volume per gram is not consistent with that required for a ceria-based mixed metal oxide which, while thermally robust, should tend to maximize both the available surface area in a given reactor volume and the mass transfer characteristics of the overall structure as well as the appropriate reactivity of that surface area, as is desired in the applications under consideration. Assuming the density, D, of this material is about 6.64 g/cm³, the skeleton has a volume, $V_S$, of 1/D, or about 0.15 cm³/g, such that the total volume, $V_T$, of one gram of this material is the sum of the pore volume, $P_V$, (0.66 cm³/gm) and the skeletal volume, $V_S$, which equals about 0.81 cm³/gm. Hence, 235 m²/gm÷0.81 cm³/gm equals about 290 m²/cm³. Because of the relatively large pore volume, the surface area per unit volume of a material of such density has a reduced value that may not be viewed as optimal.

For use of a mixed-metal oxide in a catalyst application, it is required to be loaded with a metal, such as a noble metal, providing good catalytic activity to the media being processed. While noble metals such as platinum have provided good catalytic activity, it is always desirable to improve the activity, cost, and/or durability of such catalyst metal loadings.

It is desirable to provide ceria-based mixed-metal oxide materials having the aforementioned positive properties and avoid the limitations, for use in catalytic reactions/gettering applications generally, and fuel processing catalytic reactions/gettering applications more specifically. Even more particularly, it is desirable to provide such ceria-based mixed-metal oxide materials for use in, for example, water gas shift reactions employed in fuel processing systems for the production of hydrogen-rich feed stock.

Accordingly, it is an object of the invention to provide ceria-based mixed metal oxides having the aforementioned desirable properties of relative stability, high surface areas, relatively small crystallites, and pore volumes sized to optimally balance the reduction of mass transfer resistance with the provision of sufficiently effective surface areas in a given reactor volume, particularly for use as a catalyst support or co-catalyst, though not limited thereto.

It is another object of the invention to provide such ceria-based mixed-metal oxides having enhanced redox capability, and moreover possessing good thermal stability.

It is an even further object of the invention to provide a catalyst including the ceria-based mixed metal-oxide as a support, in accordance with the forgoing objects. Further to this object, it is desired to provide the support with a catalyst metal loading that exhibits enhanced activity, cost, and/or durability.

It is a still further object of the invention to provide an efficient and economical process for making such ceria-based mixed-metal oxide catalyst supports, catalysts, and/or getters in accordance with the foregoing objects.

It is yet a further object of the invention to utilize a catalyst employing a ceria-based mixed metal oxide as a support, co-catalyst, or getter, made in accordance with the foregoing objects, in a fuel processing system in, for example, a water gas shift reaction.

DISCLOSURE OF INVENTION

The present invention relates to a ceria-based mixed-metal oxide material, and more particularly to such material having a relatively high surface area per unit of weight, relatively small crystallite diameters, pore diameters of the crystallites in the aggregate that normally exceed the crystallite diameters, and having an aggregated crystallite morphology that is thermally robust, and that optimizes the available surface area per unit volume, mass transfer characteristics, and the reactivity of that surface area. The invention also relates to the selection of metal constituents in the metal oxide mix with the ceria base, for providing the aforementioned characteristics, and may preferably include one or more of the relatively redox tolerant ions $Zr^{+4}$, $Hf^{+4}$ and $Ti^{+4}$, rare-earth ions such as typical lanthanide ions $La^{+3}$ and $Yb^{+3}$ and non rare-earth metal ions such as $Mo^{6+}$ and $Ta^{5+}$.

The invention further relates to the process(es) for making such ceria-based oxides, to the use of such ceria-based mixed-metal oxides as catalyst supports, co-catalysts, getters and the like, and to the catalyst metal supported thereby and the process for its manufacture. The invention also relates to the use of such ceria-based mixed metal oxide supports and catalysts particularly in water gas shift (WGS) and/or preferential oxidation (PROX) reactions in fuel processing systems, as for example fuel cells.

According to the invention, there is provided a material of homogeneous cerium-based binary, ternary or quaternary mixed-oxides that are nano-crystalline, have an average crystallite size less than 4 nm after calcinations at 500° C. or less, and which after calcination in air for 1-6 hours, and preferably 2-4 hours, at temperatures in the range of about 250°-600°°C., and preferably 350°-500° C., have high (large) surface areas greater than 150 m²/g, a skeletal density of about 6.5 g/cm³, pore volumes of moderate size such that the surface area per unit volume of the porous material is greater than 320 m2/cm3, and preferably greater than 420 m²/cm³, and an average pore diameter of the aggregated (agglomerated) nanocrystallites normally greater than the nanocrystallites, typically being greater than 4 nm but less than about 9 nm in keeping with pore volumes of moderate size. As used herein, the term "homogeneous" refers to the elemental composition of the individual nanocrystallites that reflects the overall elemental composition.

The ceria-based mixed-metal oxide nanocrystalline material described in this invention exhibits a fractal morphology, thus leading to a minimization in internal mass transfer resistance. Within the context of a nanoscale material, a pattern formed within an aggregate that is regular and repeating at increasing magnitudes of scale can be considered as fractal. Having a fractal structure eliminates the need to design a catalyst material with very large pore structures. If fractal, the material possesses larger, 100 to 200 nm and micron-sized pores in the aggregate (inter-particle void space, as opposed to intra-particle void space that defines the 4-9 nm pore diameters described above) which provide enough open space for gas molecules to diffuse in and react. By reducing the internal pore diameter (i. e., the inter-particle void space) to a smaller size, the internal surface area may be increased, leading to a larger number of active sites per volume and a thus a higher catalytic activity.

This combination of surface area and average pore diameter translates into relatively low internal mass transfer resistance. However, if that value becomes too small because of excessive pore size and/or volume, the effective number of sites per crystallite aggregate necessarily decreases and the amount of effective surface area per unit reactor volume also decreases. As described earlier, for a porous material of given density, D, the skeletal volume, $V_S$, is 1/D, such that the total volume of a gram of material, $V_T$, is the sum of the pore volume, $V_P$, +skeletal volume, $V_S$. From this, the surface area/gram/$V_T$ yields the surface area per unit volume of material, and it is this value which the invention seeks to maximize. Accordingly, it has been determined that the surface area per unit volume of material should be greater than 320 $m^2/cm^3$, and preferably greater than 420 $m^2/cm^3$. In this respect, because the pore diameter and pore volume are related, it has been determined that the pore diameter should be moderate and in the range of more than 4 nm but less than 9 nm. Viewed yet another way, it has been determined that the ratio of pore volume, $V_P$, to the particle, or skeletal volume, $V_S$, should not exceed about 2.5.

In addition to the cerium oxide, the other oxides in the mix are derived from one or more constituents from the group which includes Zr (zirconium), Hf (hafnium), Nb (niobium), Ta (tantalum), La (lanthanum), Pr (praseodymium), Nd (neodymium), Sm (samarium), Eu (europium), Gd (gadolinium), Tb (terbium), Dy (dysprosium), Ho (holmium), Er (erbium), Tm (thullium), Yb(ytterbium), Lu (lutetium), Mo (molybdenum), W (tungsten), Re (rhenium), Rh (rhodium), Sb (antimony), Bi (bismuth), Ti (titanium), V (vanadium), Mn (manganese), Co (cobalt), Cu (copper), Ga (gallium), Ca (calcium), Sr (strontium), and Ba (barium).

The composition of the bulk mixed metal oxide is: cerium, between 40% and 85%; zirconium or hafnium, or mixtures thereof, between 15% and 60%; one or members of the group: Ti, Re, Nb, Ta, Mo, W, Rh, Sb, Bi, V, Mn, Co, Cu, Ga, Ca, Sr, and Ba, between 0% and 10%; and one or more members of the group: Y, La, Pr, Nd, Sm, Eu, Gd, Tb, Dy, Ho, Er, Tm, Yb, and Lu, between 0% and 10%; and where all percentages are on a metals-only atomic basis. In accordance with one aspect of the invention, the cerium is between about 40% and 70%, and the zirconium or hafnium, or mixture thereof, is between about 25% and 60% and most preferably is greater than about 45%. Under another aspect of the invention, the cerium may be 60% or more. Moreover, the mixed metal oxide exhibits, via Raman spectroscopy, a cubic structure to the effective exclusion of the tetragonal phase, over all, or most, of the compositional range of interest for the several embodiments. For purposes of the discussion herein, if a constituent in the mixed metal oxide is present in an amount less than or equal to about 10% of the total, it may be referred to as a "dopant". It will be understood by those skilled in the art that not all of the listed dopants are equally effective or even desirable for all processes in which these ceria-based oxides may be used. For instance, some dopants such as Ga and Bi may not be desirable in Pt/ceria-zirconia catalysts if for use in WGS reactions.

The inventive process for making the ceria-based mixed metal oxide materials having the constituents, properties and morphology of the invention avoids the need for using surfactants and lengthy aging steps, and includes the steps of 1) dissolving salts of the cerium and at least one other constituent in water to form a dilute metal salt solution; 2) adding urea, either as a solid or aqueous solution; 3) heating the solution of metal salt and urea to near boiling (which may include boiling) to coprecipitate homogeneously a mixed-oxide of the cerium and the one or more other constituent(s) as a gelatinous coprecipitate; 4)optionally maturing, if and when beneficial, the gelatinous coprecipitate in accordance with a thermal schedule; 5) replacing water in the solution with a water miscible, low surface-tension solvent, such as dried 2-propanol; 6) drying the coprecipitate and solvent to remove substantially all of the solvent; and 7) calcining the dried coprecipitate at an effective temperature, typically moderate, for an interval sufficient to remove adsorbed species and strengthen the structure against premature aging. In the dilute metal salt solution, the metal concentration is less than 0.16 mol/L, is preferably less than about 0.02 mol/L, and is most preferably less than about 0.016 mol/L, and the urea concentration is relatively high, being greater than 0.25 mol/L and preferably about 0.5 to 2.0 mol/L. The maturing of the coprecipitate, if even required at all, is accomplished in less than 72 hours, and preferably less than about 24 hours, for example in the range of 3 to 8 hours. Indeed, it has recently been discovered that crystallization may, and often does, occur when the gelatinous coprecipitate is formed, thus further reducing or eliminating the need for maturing the coprecipitate, particularly depending upon the end use application of the material. The calcining of the dried coprecipitate occurs for 1-6 hours, and preferably 2-4 hours, at a heating rate in the range of about 2°-10° C./min with a final calcining temperature in the range of 250°-600° C., and preferably in the range of 350°-500° C.

It has been further discovered that the surface area of the ceria-based mixed-metal oxide material is, to some extent, a function of the gas atmosphere condition under which the material is calcined. A flowing gas is preferable to a static gas condition, air provides an economic source of a flowing gas that provides good results, and calcining the oxide material under flowing $CO_2$, or more preferably under $CO_2$ mixed with a dilute $O_2$ mixture, such as a mixture ranging from 20% $CO_2$; 40% $O_2$; and 40% Ar to 80% $CO_2$; 10% $O_2$; and 10% Ar, or even more preferably under $CO_2$ followed by such a mixture of dilute $O_2$, but without $CO_2$, appears to yield particularly large surface areas, in excess of 250 $m^2/g$.

The ceria-based mixed-metal oxide material of, and made in accordance with, the invention finds particular utility as a catalyst support in a catalytic fuel processing system. A highly dispersed catalyst metal is loaded on the described mixed-metal oxide support to a concentration in the range of 0.1 to 6.0 wt %. The catalyst metal is chosen to have crystallites that are predominantly less than 2.5 nm in size, and preferably less than 2.0 nm. The catalyst metal may typically be a noble metal, with platinum being preferred.

Although the catalytic activity afforded by Pt is relatively high and effective for many processes, it has been discovered that the addition of rhenium (Re) with the loading of the noble metal (e.g., Pt) on the mixed-metal oxide support yields a water gas shift and/or PROX catalyst of particularly high activity. The turnover rate (TOR—the rate per second at which Moles of CO are converted per Mole of Pt) is significantly greater for such catalysts that include Re relative to those that have Pt without Re. The Re is loaded, to a concentration in the range of 0.5 to 6.0 wt %, on the mixed metal oxide support previously loaded with the catalyst noble metal.

The process for loading the catalyst comprises the steps of 1) surface treating the support in a solution containing an acid from the group consisting of amino acids, hydroxy dicarboxylic acids, hydroxy polycarboxylic acids, and keto polycarboxylic acids; and 2) loading the catalyst metal by submerging the surface-treated support in a solution containing the catalyst metal. The acid used for surface treating the support is preferably malic acid or citric acid. The solution containing the catalyst metal may be a solution of tetraamine-platinum nitrate having about 1 weight percent platinum, 1 weight percent ammonia hydroxide and 15 weight percent 2-propanol, and the surface-treated support is submerged therein for about 2 hours at room temperature, following which it is filtered and dried. The catalyst-loaded support is then calcined for up to 4 hours at a heating rate of about 2° C./min to a calcining temperature in the range of 250°-600° C., and more preferably in the range of 350°-500° C. The resulting catalyst is then used, in accordance with another aspect of the invention, in a water gas shift reactor and/or a preferential oxidizer in a fuel processing system.

In accordance with an aspect of the catalyst loading process of the invention, it has been found to be particularly desirable to carefully tailor the surface treatment step to the acid being used and the particular composition of the ceria-based mixed-metal oxide support, in order to accomplish the desired surface treatment without excessive degradation of the oxide support material. In this regard, the nanocrystalline mixed metal oxide is first titrated with the acid to be used in order to establish a titration curve having an equivalence point at which the pH stabilizes despite the continued addition of the titrant acid. The titration curve, or a family of such curves for differing acids and/or support materials, is then used to optimize the surface treatment process.

In accordance with a further aspect of the catalyst loading process of the invention, there is provided a preferred process for loading the Re on to the noble metal-loaded mixed-metal oxide. The source of the Re is not particularly critical, and may include ammonium perrhenate ($NH_4ReO_4$), perrhenic acid ($HReO_4$), rhenium carbonyl ($Re_2(CO)_{10}$), or the like, with either of the first two mentioned examples having a cost advantage. The noble metal-loaded nanocrystalline mixed metal oxide of the invention is immersed in an appropriate solvent; water or a water containing mixture, is an excellent solvent for the ammonium perrhenate ($NH_4ReO_4$) or perrhenic acid ($HReO_4$), while an organic solvent like tetrahydrofuran is an excellent solvent for rhenium carbonyl ($Re_2(CO)_{10}$) in this application. After an optional degassing or inert gas purging step, the noble metal-loaded, preferably Pt-loaded, nanocrystalline mixed metal oxide is contacted with a hydrogen containing gas to reduce and/or remove chemisorbed oxygen from the surface of the noble metal. Separately, the Re source material in the amount sufficient to add the desired amount of Re to the noble metal-loaded nanocrystalline mixed-metal oxide is combined with the solvent to form a solution. This solution then replaces, or is added to, the solvent contacting the solid such that the noble metal-loaded mixed-metal oxide is contacted with the Re source-containing solution. Contact with the hydrogen-containing gas is continued to reduce the perrhenate ion, which in turn results in a close association of the Re with the Pt. If rhenium carbonyl is used, the interaction with the noble metal under hydrogen is believed to result in the decomposition of the rhenium carbonyl, thus depositing Re on the noble metal. As one skilled in the art will recognize, the rhenium carbonyl can be replaced with another reasonably labile rhenium compound/complex or an organometallic rhenium compound free of known or suspected elements deleterious to the catalyst. The mixture is then stirred under the $H_2$ flow for a period of time, followed by a switch to an inert gas. After the hydrogen gas is substantially removed, oxygen or air may be gradually introduced to the inert gas with care being taken that the temperature is maintained below 50° C., preferably below about 30° C. It is also preferable to remove all, or nearly all, of any flammable solvent before the oxygen is introduced. This passivation step is important to prevent pyrophoric ignition upon contact with air, and may be accomplished using alternative equivalent passivation techniques.

While varying the amount of catalytic material or loading of an active metal to suit a particular feed stream is not unknown in the art of catalysis, varying the composition of a catalyst within a catalyst family for a particular feed stream to optimize its performance is unusual. It has been discovered that for a given reformate stream that is a mixture of CO, $CO_2$, $H_2$, $H_2O$ and other gases, where the $H_2O/CO$ ratio is less than about 6, that a series of noble metal-loaded nanocrystalline mixed metal oxides have similar CO conversion to $CO_2$ turnover rates over a range of cerium to zirconium or hafnium ratios, but surprisingly for $H_2O$ to CO ratios between 6-30, keeping all other reactant and product concentrations fixed, differences in WGS activity emerge with differences in cerium-to-zirconium or hafnium ratios. Thus, it has been discovered that the WGS catalyst composition may be "tailored" to maximize its activity for a particular range of feed gas composition, and likewise, that the feed gas composition may be tailored through the addition of water and/or the removal of $CO_2$ and/or $H_2$ to operate in the regime of maximum catalyst activity. Furthermore, this aspect of the invention also covers the use of a catalyst bed where either the cerium-to-zirconium or hafnium ratio changes or the Pt-to-Re ratio changes, or both, along the catalyst bed to optimize performance.

According to this aspect of the invention, there is provided a method of optimizing water gas shift activity for a water gas shift reaction on a reformate, or reformate range of interest, in the presence of a shift catalyst. The method comprises the steps of: determining certain compositional characteristics of one or more reformates for a range of reformate compositions comprising a reformate range of interest; determining the respective activity rates for a range of shift catalyst compositions relative to the reformate range of interest; and selecting for the water gas shift reaction, from the range of shift catalyst compositions, a shift catalyst composition having a favorable activity rate for the reformate range of interest or alternatively, from the reformate range of interest, a reformate composition providing a favorable activity rate to a predetermined shift catalyst composition. Within this method, the range of shift catalyst compositions comprises a range of atomic % ratios of Ce to one or both of Zr and Hf for a ceria-based mixed-metal oxide catalyst support. This range of shift catalyst compositions may also comprise a range of weight % ratios of Pt to Re, or a range of shift catalysts where both the oxide composition and the metal loading composition is optimized to the feed composition of the expected gas composition at a given point in a conversion reactor. Further, the range of reformate compositions comprises at least $H_2O$ to CO partial pressure ratios.

While not wishing to be bound to the following theory, it is believed that the relationship described above is due to changes in the catalyst kinetic rate expression with composition, and that these changes reflect among other factors the degree of reduction of the oxide, and the relative surface population of CO, $H_2O$ and $CO_2$ species, or species derived therefrom, on the surface of the nanocrystalline oxide as the composition of the reformate changes. In the nanocrystalline material of the invention where the nanocrystals are only 4 to 6 unit cells in diameter, the change surface species can change the subsurface structure. This in turn impacts the oxide ion conductivity and electronic conductivity. Changes in the oxide composition, such as changes in the Ce to Zr ratio or the addition of dopants magnify or mitigate these changes through their influence of the relative surface populations and on the equilibrium degree of reduction of the oxide imposed by given reformate composition present over the nanocrystalline oxide at a given temperature and noble metal composition and loading.

The foregoing features and advantages of the present invention will become more apparent in light of the following detailed description of exemplary embodiments thereof.

BEST MODE FOR CARRYING OUT THE INVENTION

Figure 1:
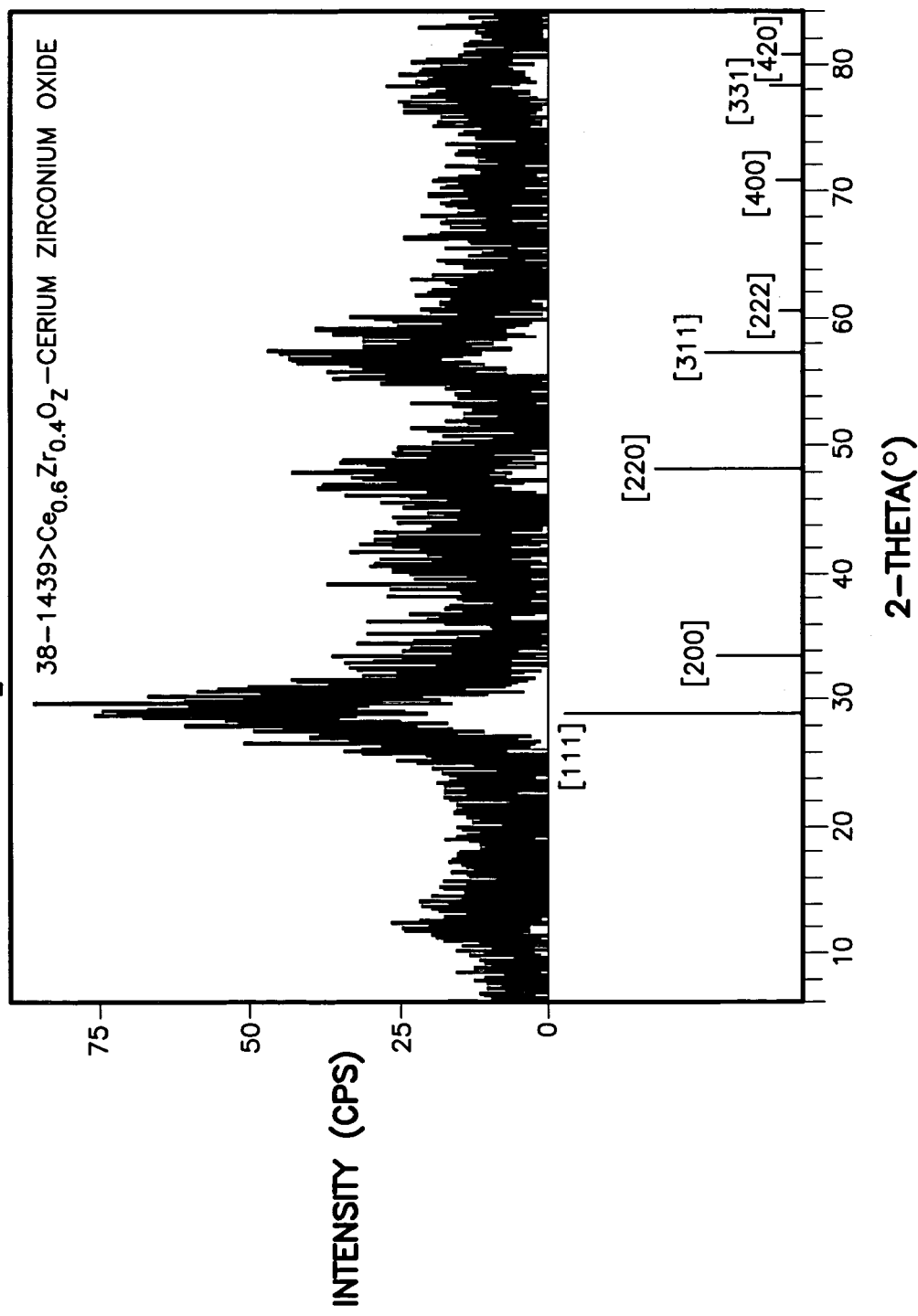
FIG. 1 is a powder X-ray diffraction pattern of a ceria-zirconia swollen gel, as formed in solution in accordance with the invention.

The invention relates to a ceria-based mixed-metal oxide material, useful as a catalyst support, a co-catalyst and/or a getter, and to the catalyst metal supported thereby in the instance of catalyst usage. The invention also relates to the processes associated with making such ceria-based mixed metal-oxide materials, as supports, catalysts, and/or getters (i.e., sulfur sorber). The invention further relates to use of such ceria-based mixed metal oxides as catalysts, or catalyst supports, in fuel processing systems. As used herein, a supported catalyst, or simply catalyst, comprises the combination of a catalyst support and a catalyst metal dispersed thereon. The catalyst metal may be referred to as being loaded on to the catalyst support, and may, in instances herein, be referred to simply as "the catalyst", depending on the context of usage. Because the ceria-based mixed metal oxide material and process of the invention finds particular utility as a catalyst support, though is not limited to such use, the following discussion of that oxide material and the process by which it is made is in the context of such a support. Thus, reference to "the support" is synonymous with the oxide material of the invention and will typically be used for simplicity.

It is desirable to efficiently maximize the effective surface area of a catalyst support, particularly for use in water gas shift (WGS) reactions and/or preferential oxidation (PROX) reactions to process hydrocarbon feedstocks into hydrogen-rich-fuels for fuel cells, in order to make the resulting reaction as efficient as possible. Consequently, the proper combination of relatively high surface area per unit skeletal density coupled with relatively, though not excessively, large pores that minimize internal mass transfer resistance without creating excessive pore volume, results in a highly effective catalyst that increases catalyst efficiency by maximizing the amount of effective surface area within a given reactor volume. By increasing the efficiency of a catalyst in such a reaction, it is possible then to either increase the reaction flow for a given reactor volume or to decrease the reactor volume for a given reaction flow, or a combination of the two. The use of such fuel processing systems in mobile applications places considerable emphasis on reducing size/volume, as will be understood. The improved catalyst support/catalyst/getter of the invention contribute to this objective.

The process(es) and product(s) of the invention involve the formation of high surface area ceria-based mixed-metal oxides as catalyst supports and catalysts of the type particularly suited for use in WGS reactions and PROX reactions, as for the fuel processing system associated with providing a hydrogen-rich fuel supply to a fuel cell. Moreover, the supports and catalysts are formed by processes that are efficient and effective. Consideration will first be given to the formation of the high surface area ceria-based mixed-metal oxide material of the catalyst support, and then to the formation/loading of the catalyst metal on that support.

The support is a homogeneous structure of cerium oxide and at least one other metal oxide constituent that are all nano-crystalline, that is, less than about (<) 4 nm. For binary mixed-metal oxides, the other constituents preferably are selected from the group consisting of zirconium and hafnium. Further still, some advantage may be derived from homogeneous ternary and/or quaternary cerium-zirconium or cerium-hafnium based mixed oxides that provide the same nano-crystalline structure. In providing the homogeneous ternary and/or quaternary mixed oxides of cerium and either zirconium or hafnium, the additional constituents, or dopants, are selected from the group of metals consisting of rare earth metals La (lanthanum), Pr (praseodymium), Nd (neodymium), Sm (samarium), Eu (europium), Gd (gadolinium), Tb (terbium), Dy (dysprosium), Ho (holmium), Er (erbium), Tm (thullium), Yb (ytterbium), Lu (lutetium), and non-rare earth metals Cu (copper), Mo (molybdenum), W (tungsten), Nb (niobium), Ta (tantalum), Re (rhenium), Rh (rhodium), Sb (antimony), Bi (bismuth), V (vanadium), Mn (manganese), Co (cobalt), Ga (gallium), Ca (calcium), Sr (strontium), Ba (barium), and Ti (titanium). The composition of the bulk mixed metal oxide is: cerium, between 40% and 85%; zirconium or hafnium, or mixtures thereof, between 15% and 60%; one or members of the group: Ti, Re, Nb, Ta, Mo, W, Rh, Sb, Bi, V, Mn, Co, Cu, Ga, Ca, Sr, and Ba, between 0% and 10%; and one or more members of the group: Y, La, Pr, Nd, Sm, Eu, Gd, Tb, Dy, Ho, Er, Tm, Yb, and Lu, between 0% and 10%; and where all percentages are on a metals-only atomic basis. In accordance with one aspect of the invention, the cerium is between about 40% and 70%, and the zirconium or hafnium, or mixture thereof, is between about 25% and 60% and most preferably is greater than about 45%. Under another aspect of the invention, the cerium may be 60% or more. Moreover, the mixed metal oxide preferably exhibits a cubic structure over the compositional range of interest for the several embodiments.

It will be understood and appreciated that by using the process of the invention, these cerium-based mixed-metal oxides form support structures that have a nano-crystalline structure that, on average, is less than about 4 nm, as determined by powder x-ray diffraction line broadening; a high B. E. T. surface area that exceeds 150 m$^2$/g after calcination at about 400° C. for about 4 hours, and typically is about 180 m$^2$/g or more; and relatively large pores as determined by nitrogen adsorption, the average pore size as determined by the maximum in the pore size distribution curve for the material being greater than 4 nm, and typically 5 nm or greater, to about 9 nm, and thus normally larger than the crystallite size. These characteristics tend to maximize and optimize the surface for interaction with the gas phase, by combining relatively high surface area per unit skeletal density with relatively, though not excessively, large pores that minimize internal mass transfer resistance without creating excessive pore volume, to result in a highly effective catalyst that increases catalyst efficiency by maximizing the amount of effective surface area within a given reactor volume. These characteristics also make the material very well suited for the support of small, i. e., less than about 2.0-2.5 nm, metal clusters or crystallites. Thus the ceria-based mixed-metal oxide with this morphology and bearing these small metal particles on its surface is ideally suited for use as a catalyst in the WGS reaction where, it is reported, the CO chemisorbed on the surface of the metal particles undergoes nucleophilic attack by oxide ions from the mixed metal oxide, converting it to $CO_2$ and reducing the mixed metal oxide which is reoxidized by the reaction of the oxide with water, a reaction that liberates hydrogen.

Referring to the process by which supports having the aforementioned structure and characteristics are formed, a novel method of synthesis by homogeneous coprecipitation is used. While homogeneous coprecipitation methods are known, including the use of urea as in the present invention, the steps and parameters of the process of the invention are specific and unique, and yield the improved ceria-based mixed-metal oxide support in a novel and efficient manner. The synthesis method used in the invention has the advantage of relatively short, or even no, aging, or maturing, time, the avoidance of expensive reagents like alcoxides, and the avoidance of super-critical solvent removal.

An important part of the support-forming method is that the coprecipitation is performed in a very dilute metal salt solution, which is believed to prevent particles/nuclei from growing to a larger size (i.e., >4 nm). The total metal concentration in the solution is less than 0.16 mol/L, is preferably less than about 0.02 mol/L, and most preferably, is less than about 0.016 mol/L. The solution, in addition to the metal salt(s), also includes urea. Another important aspect is that the urea concentration must be high, at least 0.1 mol/L, and preferably being about 0.5-2 mol/L. The solution, containing the appropriate amounts of metallic salt and urea to attain the requisite concentrations, is heated to near boiling, which may include boiling, while stirring, to cause the hydrolysis of the urea and thus the reaction of the soluble metal ions with the urea hydroloysis products to form a cloudy suspension of nanocrystals. The coprecipitation of the various metal oxides quickly begins and is completed, typically in less than one minute. The resulting coprecipitate is gelatinous. While stirring is continued, the mixture of coprecipitate (hereinafter referred to sometimes simply as "precipitate") and solution may optionally be aged, or matured, though is not necessary for many applications. To the extent required at all, the step of aging the coprecipitate mixture is relatively fast, being less than 72 hours, preferably less than about 24 hours, and most typically being in the range of 3 to 8 hours or less. The aging step comprises heating, or maintaining the heating of, the mixture to, or near, its boiling temperature for about, for example, 7 hours, and then continuing to stir and allowing to cool to ambient room temperature for an additional period of, for example, about 16 hours. The continued heating after the formation of the nanocrystalline suspension is neither particularly helpful nor harmful, nor is an extended period of stirring during and after cool down. Indeed, it has recently been discovered that crystallization may, and often does, occur when the gelatinous coprecipitate is formed, thus further reducing or eliminating the need for maturing the coprecipitate, particularly depending upon the use application of the material.

The mixture is then filtered, and the resulting filter cake is washed, typically twice, with de-ionized water at about boiling temperature. Importantly, the water associated with the filter cake is then replaced with a water-miscible, low surface-tension solvent. This serves to reduce the capillary pressure exerted by the solvent on the solid oxide during a subsequent drying step. The water-miscible, low surface-tension solvent may be an alcohol with 4 carbons or less, and preferably 3 carbons or less, or a ketone or an ester, each with 4 carbons or less. A preferred such solvent is dried 2-propanol, with other examples including propanone (acetone), methyl ethyl ketone, and 1-propanol. This may be accomplished in various ways, but preferred herein is first washing the filter cake several times with the water-miscible, low surface-tension solvent at room temperature, and then mixing fresh, dried, water-miscible, low surface-tension solvent with the precipitate and heating to reflux for about 45 minutes. The need for the reflux wash will be determined by the effectiveness of the prior lower temperature washes in replacing the water. The washed precipitate may be freed from excess solvent by any of the several means known in the art including filtration, centrifugation, spray drying, etc. Alternatively, the washed precipitate may be effectively suspended in a sufficient amount of liquid and that suspension used either directly or after the addition of a binder or binder components, to wash coat monoliths, foams, and/or other substrate objects. In a more concentrated form, the washed precipitate may be extruded, as by a syringe or the like.

The resulting coating or extrudate then undergoes a drying step to remove the remaining solvent. This may be accomplished by any of the variety of means known in the art, but vacuum oven drying at about 70° C. for about 3 hours is effective, and the extrudate may then remain in the oven at that same temperature, but without vacuum, for an additional period that may be about 16 hours.

Following drying, the oxide, or the aforementioned formed and dried mixed metal oxide may be calcined at 250° C.-600° C., and preferably about 350° C.-500° C., for an interval sufficient to remove adsorbed species and strengthen the structure against premature aging. Lower temperatures typically mean more physisorbed and chemisorbed solvent and/or carbonates, while higher temperatures and longer times mean the reverse. In an exemplary process, the calcining required is about 4 hours with a heating rate of about 2° C./minute. The calcining process typically begins at a temperature of about 70° C., and the calcining temperature selected is based on a balance of increased surface area at the lower end of the time/temperature range vs. assured removal of contaminants at the upper end.

Following calcination, the precipitate possesses the properties desired of the support of the invention, to wit, homogeneous mixed oxides of at least cerium and typically zirconium, hafnium, and/or various constituents, that are nanocrystalline, typically less than 4 nm for calcinations at 500° C. or less, and that collectively define a structure having large pores, typically of more than 4 nm, in the range of more than 4 nm to less than about 9 nm, and thereby have a large surface area greater than 150 m$^2$/g, typically 180 m$^2$/g or greater. This combination of surface area and average pore diameter translates into relatively low internal mass transfer resistance. However, if that value becomes too small because of excessive pore size and/or volume, the effective number of sites per crystallite aggregate necessarily decreases and the amount of effective surface area per unit reactor volume also decreases. For a porous material of given density, D, the skeletal volume, $V_S$, is 1/D, such that the total volume of a gram of material, $V_T$, is the sum of the pore volume, $V_P$, +skeletal volume, $V_S$. From this, the surface area/gram/$V_T$ yields the surface area per unit volume of material, and it is this value which the invention seeks to maximize. Accordingly, it has been determined that the surface area per unit volume of material should be greater than 320 m$^2$/cm$^3$, and preferably greater than 420 m$^2$/cm$^3$. Viewed yet another way, it has been determined that the ratio of pore volume, $V_P$, to the particle, or skeletal volume, $V_S$, should not exceed about 2.5. It is important to realize that skeletal volume is more appropriate than mass when dealing with a high skeletal or crystallite density like CeO$_2$, (7.132 g/cm$^3$). For example, a given surface area/g of CeO$_2$ will translate to about 2½ times the surface area, m$^2$, per unit volume, cm$^3$, than for the same given surface area/g of a the less-dense catalyst support material SiO$_2$, which has a crystallite density of 2.65 g/cm$^3$.

At this point the mixed metal oxide, as described, is complete as to its chemical and micro-morphology, although if necessary its macro-morphology (>several microns) may be adjusted. If the mixed metal oxide is to be loaded with precursors of what will become a highly dispersed catalytically-active metallic phase, further treatment steps may be necessary as will be described later in connection with further aspects of the invention. Immediately following are examples in which the above-described process or some variants thereof, are described in detail for illustrative or comparative purposes. These examples are of mixed metal oxides used as catalyst supports, and are intended to be illustrative, and not limiting.

It is helpful at this juncture to identify and/or describe the techniques used to identify crystallite size, support surface area, pore volume, and average pore diameter herein.

Average crystallite size was determined by powder X-ray diffraction line broadening using powder X-ray diffraction patterns (PXRD) and the Debye-Scherrer equation:

$$t=(0.9*\lambda)/B \cos \theta_B, \text{ where:}$$

t=Crystallite thickness;

0.9 or 1.0=crystal shape factor;

$\lambda$=Wave length of Radiation (angstroms);

B=breadth of diffraction peak (radians);

$\theta_B$=Bragg angle (degree).

The surface area of the mixed metal oxide support was determined by first determining nitrogen adsorption-desorption isotherms at liquid nitrogen boiling temperature by the classical volumetric method with a Micromeretics ASAP 2010 instrument and then calculating the surface area using the well-known BET method.

Pore volume was determined by the volume of the adsorbate taken at a relative pressure of P/P$_0$=0.98955093.

Pore size distribution data and curves were calculated from the desorption branch of the isotherm using the BJH method.

The average pore diameter was determined by dividing the pore volume by the surface area, the result being multiplied by a factor depending on the pore shape. The equation 4V/A was used for cylindrical pores where V and A are, respectively, the pore volume and the surface area as determined above.

EXAMPLE 1

The following is an example demonstrating the method of preparation for a ceria-zirconia nanocrystalline support material as described in this invention and the resulting properties. A Ce$_{0.65}$Zr$_{0.35}$O$_2$ catalyst support (Sample UR27) is prepared by dissolving 26.7 g of (NH$_4$)$_2$Ce(NO$_3$)$_6$, 7.2 g of ZrO(NO$_3$)$_2$. xH$_2$O and 576 g of urea in 4800 mL of de-ionized water. The solution is heated to its boiling temperature while stirring until coprecipitation is observed. The mixture is then aged at boiling temperature for 7 hours and then is left stirring at room temperature for 16 hours. The mixture is filtered using a Büchner funnel. The resulting filter cake is washed twice with 500 mL of de-ionized water at boiling temperature while stirring for 10 minutes, and then filtered again after each washing step. Then the filter cake is washed three times with 100 mL of dried 2-propanol while in the Büchner funnel. Then, if necessary, the precipitate is mixed with 400 mL of dried 2-propanol and heated to reflux for 45 minutes and then filtered again before being extruded, as through a syringe. The extrudates are dried in a vacuum oven at 70° C. for 3 hours and then left in the oven at 70° C. (overnight) for 16 hours without vacuum. The extrudates are then calcined at 500° C. for 4 hours with a heating rate of 2° C./min.

After calcination at 500° C., the surface area of the support is 180 m$^2$/g and has an average crystallite size of 34.1 Å (3.41 nm). The pore volume is 0.25 cm$^3$/g and the average pore diameter is 55 Å (5.5 nm). Another support (Sample UR 17)

prepared with essentially the same parameters has a surface area of 187 m$^2$/g and an average crystallite size of 32.3 Å (3.23 nm).

COMPARATIVE EXAMPLE 2

The following is an example demonstrating how a ceria-zirconia nanocrystalline material, prepared from a metal solution of lower dilution compared to Example 1, yields a smaller surface area that is unsatisfactory. A $Ce_{0.65}Zr_{0.35}O_2$ catalyst support (Sample UR48) was synthesized as described in Example 1 with the modification that the amount of urea and water used was 60 g and 500 mL, respectively. After calcination, the surface area of the support is 144 m$^2$/g, the pore volume is 0.22 cm$^3$/g, and the average pore diameter is 60 Å.

COMPARATIVE EXAMPLE 3

The following is an example demonstrating a ceria-zirconia oxide with a significantly reduced and undesirable surface area when water is not displaced or exchanged by a low surface-tension solvent as in Example 1. A $Ce_{0.65}Zr_{0.35}O_2$ catalyst support (Sample UR19) was synthesized as described in Example 1 with the modification that there was no replacement of water, as with the low surface tension solvent or otherwise. After calcinations at 500° C., the surface area of the support) was 116 m$^2$/g.

EXAMPLE 4

The following is an example demonstrating a ternary mixed metal oxide in accordance with the invention where the dopant is a rare-earth metal. A $Ce_{0.625}Zr_{0.325}PrO_2$ catalyst support (Sample UR26) was prepared as described in Example 1 with the modification that the amount of $(NH_4)_2Ce(NO_3)_6$ and $ZrO(NO_3)_2$ used was 25.7 g and 6.7 g, respectively, and 1.63 g of $Pr(NO_3)_3.6H_2O$ was also added to the solution. After calcination, the surface area of the support is 182 m$^2$/g, the pore volume is 0.26 cm$^3$/g, and the average pore diameter is 56 Å (5.6 nm).

EXAMPLE 5

The following is an example demonstrating yet another ternary mixed metal oxide in accordance with the invention where the dopant is a rare-earth metal. A $Ce_{0.625}Zr_{0.325}La_{0.05}O_2$ catalyst support (Sample UR37) was prepared as described in Example 4 with the modification that 1.62 g of $La(NO_3)_3.6H_2O$ was used instead of the 1.63 g of $Pr(NO_3)_3.6H_2O$, and the resulting extrudates were calcined at 450° C. instead of 500° C. After calcination, the surface area of the support is 204 m$^2$/g, the pore volume is 0.25 cm$^3$/g, and the average pore diameter is 49.9 Å (4.9 nm). The average crystallite size is 28.6 Å (2.86 nm).

EXAMPLE 6

The following is an example demonstrating a ternary mixed metal oxide in accordance with the invention where the dopant is a non rare-earth metal. A $Ce_{0.7}Zr_{0.22}Nb_{0.08}O_2$ catalyst support (Sample UR84) was prepared as described in Example 1 with the modification that the amount of $(NH_4)_2Ce(NO_3)_6$ and $ZrO(NO_3)_2$ used was 28.8 g and 4.54 g, respectively, and 7.94 g of niobium oxalate was also added to the solution. After calcination, the surface area of the support is 152 m$^2$/g, the pore volume is 0.24 cm$^3$/g, and the average pore diameter is 64 Å (6.4 nm).

EXAMPLE 7

The following is yet another example demonstrating a ternary mixed metal oxide in accordance with the invention where the dopant is a non rare-earth metal. A $Ce_{0.70}Zr_{0.20}Ga_{0.05}O_2$ catalyst support (Sample UR74) was prepared as described in Example 1 with the modification that the amount of $(NH_4)_2Ce(NO_3)_6$ and $ZrO(NO_3)_2$ used was 28.8 g and 4.13 g, respectively, and 2.13 g of $Ga(NO_3)_3.xH_2O$ was also added to the solution. After calcination, the surface area of the support is 180 m$^2$/g, the pore volume is 0.24 cm$^3$/g, and the average pore diameter is 54 Å (5.4 nm).

EXAMPLE 8

The following is an example demonstrating the effect of a rare-earth dopant in combination with cerium, but in the absence of zirconium or hafnium. A $Ce_{0.80}Gd_{0.20}O_2$ catalyst support (Sample UR78) is prepared by dissolving 32.89 g of $(NH_4)_2Ce(NO_3)_6$, 6.77 g of $Gd(NO_3)_3.6H_2O$ and 576 g of urea in 4800 mL of de-ionized water. The catalyst support is hereafter prepares as described in Example 5. After calcination, the surface area of the support is 222 m$^2$/g, the pore volume is 0.37 cm$^3$/g, and the average pore diameter is 67 Å (6.7 nm). In this example, it is seen that the use of yet another rare earth dopant, in this instance Gd (gadolinium), in combination with cerium, but in the absence of zirconium or hafnium, yields a particularly large surface area, pore volume on a unit weight basis, and pore diameter. However, on an activity-per-surface area basis, the performance of this catalyst support was deficient, and reflects the likelihood that water gas shift activity is positively affected by the presence of Zr, and the reverse by its absence.

EXAMPLE 9

The following is an example demonstrating a ceria-hafnia nanocrystalline support material as described in this invention. A $Ce_{0.65}Hf_{0.35}O_2$ catalyst support (Sample UR94) was synthesized as described in Example 1 with the modification that 9.7 g of $HfO(NO_3)_2.5H_2O$ was used instead of 7.2 g of $ZrO(NO_3)_2.xH_2O$, and that the extrudates were calcined at 400° C. instead of 500° C. Following calcination, the surface area of the support was 180 m$^2$/g, the pore volume was 0.21 cm$^3$/g, and the average pore diameter was 46.2 Å (4.62 nm). The average crystallite diameter was 26.0 Å (2.6 nm). This oxide, after subsequent loading with Pt, was tested and found to be active for water gas shift catalysis.

In addition to the aforementioned Examples of numerous Samples, the following Table 1 includes seven additional Samples of ternary mixed-oxides and their respective relevant properties:

TABLE 1

| Sample | Ce | Zr | Dopant | Amount | Clcn Temp °C. | Srfc Area m²/g | Avg Pore Dia Å | Pore Vol cm³/g | Avg Crys Size Å |
|---|---|---|---|---|---|---|---|---|---|
| UR39 | 0.625 | 0.325 | Sm | 0.05 | 450 | 185 | 55 | 0.26 | 31 |
| UR43 | 0.625 | 0.325 | Eu | 0.05 | 450 | 188 | 56 | 0.26 | 34 |
| UR38 | 0.625 | 0.325 | Gd | 0.05 | 450 | 196 | 54 | 0.26 | 32 |
| UR46 | 0.625 | 0.325 | Tb | 0.05 | 450 | 202 | 53 | 0.27 | 33 |
| UR47 | 0.625 | 0.325 | Yb | 0.05 | 450 | 182 | 58 | 0.26 | 37 |
| UR76 | 0.700 | 0.200 | Mo | 0.10 | 450 | 191 | 55 | 0.26 | 33 |
| UR70 | 0.750 | 0.200 | Nb | 0.05 | 450 | 175 | 65 | 0.28 | 38 |

The Samples of Table 1 each contain, on a metals-only basis, between 40 and 85 atomic % of Ce, between 15 and 60 atomic % of Zr, and between 0 and 10 atomic % of several different dopants. All of those Samples were calcined at 450° C., and resulted in mixed metal oxides having surface areas of 175 to 202 m²/g, average pore diameters of 53 to 65 Å (5.3-6.5 nm), pore volumes in the range of 0.25-0.28 cm³/g, and average crystallite sizes, as determined by the Jade program, of 31-38 Å. Though not shown in Table 1, the lattice parameters of these samples were in the range of 5.33 to 5.38 Å. The earlier-mentioned Samples of Examples 1-9 serve to expand those ranges somewhat, with the lattice parameter, which is an indication of homogeneity, in particular expanding its range to 5.32-5.42 Å., the surface area increasing to 222 m²/g, the average pore diameter range increasing to 50-67 Å, and the average crystallite size range extending to 29 Å. The pore volumes of relevant Examples 1, 4 and 5 were similar to those of Table 1; the Example 9, with Hf instead of Zr, had a pore volume of 0.21 cm3/g,; whereas the non-Zr, non-Hf, Example 8 had a pore volume of 0.37 cm³/g.

Consideration will now be given to the data presented in Table 2, wherein the identifiers UR86, UR87, and UR88 represent three mixed metal oxides of the invention, with differing amounts of Ce and Zr, and CZ68 and CZ80 represent Ce and Zr oxides made in accordance with the teachings of the article by Terribile, et al referenced earlier in the Background Art section. The numbers immediately following the identifiers are the temperatures (° C.) at which they were calcined. The CeO has a density of 7.132 and the ZrO₂ density is 5.6 g/cm³. From left to right, beginning with the fourth column, there is surface area (SA); pore volume ($V_P$); Average Pore diameter; total volume ($V_T$), which is the sum of $V_P$ and $V_S$; Surface Area per $V_T$; Density of Ce/Zr skeleton (D); volume of skeleton ($V_S$); and the ratio of $V_P$ to $V_S$ ($V_P/V_S$).

TABLE 2

| # | % Ce 7.132 | % Zr 5.6 | SA m2 gr | $V_P$ cm3 per gram | Ave Pore dia nm | V(t) cm3 of gram | SA/ Vt m2 cm3 | D(s) g/ cm3 skel | Vs cm3/g | Vp/ Vs |
|---|---|---|---|---|---|---|---|---|---|---|
| UR88-450 | 0.8 | 0.2 | 215 | 0.27 | 5.02 | 0.42 | 516 | 6.83 | 0.147 | 1.84 |
| UR88-550 | 0.8 | 0.2 | 175 | 0.24 | 5.49 | 0.39 | 453 | 6.83 | 0.147 | 1.64 |
| UR88-650 | 0.8 | 0.2 | 126 | 0.21 | 6.67 | 0.36 | 353 | 6.83 | 0.147 | 1.43 |
| UR87-450 | 0.75 | 0.25 | 214 | 0.29 | 5.42 | 0.44 | 488 | 6.75 | 0.148 | 1.96 |
| UR87-550 | 0.75 | 0.25 | 164 | 0.26 | 6.34 | 0.41 | 402 | 6.75 | 0.148 | 1.75 |
| UR87-650 | 0.75 | 0.25 | 127 | 0.23 | 7.24 | 0.38 | 336 | 6.75 | 0.148 | 1.55 |
| UR86-450 | 0.68 | 0.32 | 197 | 0.27 | 5.48 | 0.42 | 468 | 6.64 | 0.151 | 1.79 |
| UR86-550 | 0.68 | 0.32 | 156 | 0.25 | 6.41 | 0.40 | 389 | 6.64 | 0.151 | 1.66 |
| UR86-650 | 0.68 | 0.32 | 116 | 0.22 | 7.59 | 0.37 | 313 | 6.64 | 0.151 | 1.46 |
| CZ80-450 | 0.8 | 0.2 | 208 | 0.86 | 16.54 | 1.01 | 207 | 6.83 | 0.147 | 5.87 |
| CZ80-650 | 0.8 | 0.2 | 163 | 0.56 | 13.74 | 0.71 | 231 | 6.83 | 0.147 | 3.82 |
| CZ68-450 | 0.68 | 0.32 | 235 | 0.66 | 11.23 | 0.81 | 290 | 6.64 | 0.151 | 4.38 |
| CZ68-650 | 0.68 | 0.32 | 170 | 0.42 | 9.88 | 0.57 | 298 | 6.64 | 0.151 | 2.79 |

A review of Table 2 shows a decrease in surface areas as a function of calcining temperature, with the more desirable surface areas being for calcinations below about 500° C.; relatively smaller pore volumes for the mixed oxides of the invention and relatively larger for the other; pore diameters less than about 8 or 9 nm for the material of the invention and larger for the other; relatively smaller total volumes for the invention and larger for the other; relatively larger surface areas per total volume (typically greater than 320-420 m²/cm³) for the materials of the invention; and $V_P/V_S$ ratios under 2.5 for the material of the invention.

It has been discovered that the surface area of the ceria-based mixed-metal oxide material is, to some extent, a function of the gas atmosphere condition under which the material is calcined. A flowing gas is preferable to a static gas condition, air provides an economic source of a flowing gas that provides good results, and calcining the oxide material under flowing $CO_2$, or more preferably under $CO_2$ mixed with a dilute $O_2$ mixture, such as a mixture ranging from 20% $CO_2$; 40% $O_2$; and 40% Ar to 80% $CO_2$; 10% $O_2$; and 10% Ar, or even more preferably under $CO_2$ followed by such a mixture of dilute $O_2$, but without $CO_2$, appears to yield particularly large surface areas, in excess of 250 m²/g.

EXAMPLE 10

The following example demonstrates how the ceria-zirconia nanocrystalline support material described in this invention exhibits a higher surface area when calcined under a flowing gas environment and an even higher surface area when calcined under a $CO_2$ environment. A $Ce_{0.65}Zr_{0.35}O_2$ catalyst support (Sample UR119) is prepared by dissolving 53.5 g of $(NH_4)Ce(NO_3)_6$, 14.2 g of $ZrO(NO_3)_2 \cdot xH_2O$, and 1152 g of urea in 9600 mL of de-ionized water.

The solution is heated to its boiling temperature while stirring until the co-precipitation is observed. The mixture is then aged for 6 hours and then is left stirring at room temperature for 15 hours. The mixture is filtered using a Büchner funnel. The resulting filter cake is washed twice with 1000 mL of de-ionized water at boiling temperature while stirring for 10 minutes, and then filtered again after each washing step. The filter cake is then mixed three times with 200 mL of anhydrous 2-propanol while still in the Büchner funnel. The filter cake is then mixed with 800 mL of anhydrous 2-propanol and heated to reflux for 45 minutes and then filtered again before being extruded through a syringe. The extrudates are dried in a vacuum oven at 70° C. for 3 hours and then left in the oven at 70° C. overnight (15 hours) without vacuum. The extrudates are then comminuted to less than 30 mesh size. The comminuted powder is separated into 6 parts and calcined at 400° C. for 4 hours at a heating rate of 10° C./min, each under varying gas environments. The gas flow is set at a rate of 2 L/min. The resulting physical properties are given in Table 3.

TABLE 3

| Calcination Atmosphere | Calcination Temp (° C.) | Surface Area (m²/g) | Pore Volume (cm³/g) | Pore Diameter (Å) |
|---|---|---|---|---|
| Static | 400 | 182 | 0.23 | 53 |
| Air | 400 | 230 | 0.24 | 42 |
| $N_2$ | 400 | 233 | 0.25 | 43 |
| 50% $O_2$/Ar | 400 | 232 | 0.25 | 42 |
| 5% $H_2$/Ar | 400 | 228 | 0.25 | 44 |
| $CO_2$ | 400 | 251 | 0.30 | 41 |

Compared to a static calcination, where no gas is flowing through the furnace during heating, calcining in a flowing gas environment results in materials with higher surface areas. A 26% increase in surface area is observed for air, nitrogen, an oxygen-containing environment (50% $O_2$, 50% Ar), and a hydrogen-containing environment (5% $H_2$, 95% Ar), from 180 m²/g to ~230 m²/g. Furthermore, when $CO_2$ is used, the surface area is increased 38%, to ~250 m²/g.

EXAMPLE 11

The following example demonstrates how the ceria-zirconia nanocrystalline support material described in this invention exhibits a higher surface area when calcined under a $CO_2$ environment combined with an oxygen-containing environment. A $Ce_{0.65}Zr_{0.35}O_2$ catalyst support (Sample UR143) was synthesized as described in Example 10 with the modification that the mixture was then aged for 7 hours instead of 6 and the comminuted powder was separated into four parts instead of six. Of the four parts, each was calcined under a different gas ratio of $CO_2$ and an oxygen-containing environment. The combined gas flow was set at a rate of 2 L/min. The resulting physical properties are given in Table 4.

TABLE 4

| Sample | % $CO_2$ | % $O_2$ blend* | Surface Area (m²/g) |
|---|---|---|---|
| UR143 | 50 | 50 | 238 |
| UR143 | 60 | 40 | 244 |
| UR143 | 75 | 25 | 242 |
| UR143 | 90 | 10 | 240 |

*The $O_2$ blend is 50% $O_2$/50% Ar

The surface areas achieved are within error of one another signifying no change with varying gas ratio. The overall surface areas are still higher than that achieved for a static environment or for the other non-$CO_2$ gas environments tested, but less than that achieved for a $CO_2$ only environment (Example 10).

EXAMPLE 12

The following example demonstrates how the ceria-zirconia nanocrystalline material described in this invention exhibits a higher surface area when calcined under a $CO_2$ environment followed by an oxygen-containing environment. The $Ce_{0.65}Zr_{0.35}O_2$ catalyst support used for this example is the same catalyst prepared and described in Example 11. A portion of the sectioned comminuted powder is heated to 400° C. at a heating rate of 2° C./min, under a $CO_2$ environment. Then, the furnace is left to isotherm for 4 hours at 400° C. also under a $CO_2$ environment. After 4 hours, the gas is switched to that of an oxygen-containing environment, specifically 50% $O_2$, 50% Ar, and the furnace is cooled naturally to 25° C. The gas flow throughout this calcination process is set at a rate of 2 L/min. After calcination, the resulting material has a surface area of 237 m²/g. This surface area is comparable to that achieved in Example 11.

EXAMPLE 13

The following example demonstrates how the ceria-zirconia nanocrystalline material described in this invention exhibits a higher surface area when the oxygen-containing environment in Example 12 is changed to that of air. A $Ce_{0.65}Zr_{0.35}O_2$ catalyst support (UR137) is synthesized as described in Example 10 with the modification that the mixture is aged for 8 hours instead of 6 hours. The comminuted powder is heated to 400° C. at a heating rate of 2° C./min, under a $CO_2$ environment. Then, the furnace is left to isotherm for 4 hours at 400° C. also under a $CO_2$ environment. After 4 hours, the furnace is cooled naturally and at 265° C., the gas is switched to that of air, and the furnace is further cooled to 25° C. The gas flow throughout this calcination process is set at a rate of 2 L/min. After calcination, the resulting material has a surface area of 232 m²/g. This value is comparable to that achieved in Example 12 when an oxygen-containing environment is used for calcination.

EXAMPLE 14

The following example demonstrates how a higher surface area can be achieved also for a ceria-hafnia nanocrystalline material. A $Ce_{0.65}Hf_{0.35}O_2$ catalyst support (Sample UR174) is synthesized as described in Example 9 with the modification that 9.5 g of $HfO(NO_3)_2 \cdot xH_2O$ was used instead of 9.7 g, the mixture was aged for 6 hours instead of 7 hours, and the dried extrudates were comminuted to less than 30 mesh size before calcination. The comminuted powder was calcined at 380° C. for 2 hours at a heating rate of 10° C./min, under a $CO_2$ environment combined with an oxygen-containing environment. The exact gas composition is 90% $CO_2$, 5% $O_2$, 5% Ar. The gas flow is set at a rate of 2 L/min. After calcination, the surface area was 189 $m^2/g$, pore volume 0.28 $cm^3/g$ and average pore diameter 60 Å (6.0 nm). Compared to a similar support material containing zirconium instead of hafnium, as for example Sample UR 179 ($Ce_{0.65}Zr_{0.35}O_2$) with a surface area value of 242 $m^2/g$, the surface area is 28% lower. However, when comparing two materials with very different densities (e.g. $D(ZrO_2)$ is 5.6 $g/cm^3$ while $D(HfO_2)$ is 9.7 $g/cm^3$), it is instructive to compare instead the skeletal densities. Sample UR179 ($Ce_{0.65}Zr_{0.35}O_2$) has a skeletal density of 1596 $m^2/cm^3$, while the sample prepared in this example, Sample UR174 ($Ce_{0.65}Hf_{0.35}O_2$) has a skeletal density of 1516 $m^2/cm^3$. The difference between skeletal densities is only 5 percent. Thus, Example 14 shows the invention's applicability to high surface area ceria-zirconia nanocrystalline materials.

It has recently been discovered that crystallization may, and often does, occur when the gelatinous coprecipitate is formed, thus further reducing or eliminating the need for maturing the coprecipitate, particularly depending upon the use application of the material. To the extent that powder X-ray diffraction analysis has revealed that the precipitate gel exhibits a crystalline pattern matching closely that of the finished oxide and not the hydroxide that would have been expected, one is given evidence that the chemistry of this system is different from what would otherwise be expected. Moreover, this characteristic has implications for distinct morphology and physical properties since the structure of the material is set upon conception from the aqueous phase and is therefore more robust during processing. This characteristic further enables the shortening, or even elimination, of the aging step, depending upon the end use application.

EXAMPLE 15

The following example demonstrates how the ceria-zirconia nanocrystalline material described in this invention exhibits crystalline properties immediately after precipitation of the precursors into the gel. A $Ce_{0.625}Zr_{0.325}Sm_{0.05}O_2$ catalyst support (Sample UR216b) is prepared by dissolving 51.4 g of $(NH_4)Ce(NO_3)_6$, 13.2 g of $HfO(NO_3)_2 \cdot xH_2O$, and 576 g of urea in 4800 mL of de-ionized water. The solution is heated to its boiling temperature while stirring until the co-precipitation is observed. Immediately after the precipitate is formed, a sample is collected for analysis. The powder X-ray diffraction of the swollen gel is given in FIG. 1 and shows a crystalline pattern matching closely to that of $Ce_{0.6}Zr_{0.4}O_2$. The gelatinous precipitate is therefore classified as a crystalline material. This is contrary to reports in the literature which traditionally state that an amorphous metal hydroxide material is formed upon precipitation, which is converted to a crystalline metal oxide structure only after the calcination step. The presence and recognition of this feature is very unique, and also has implications for distinct morphology and rare physical properties since the structure of the material is set upon conception from the aqueous phase and is therefore more robust during processing.

EXAMPLE 16

Figure 2:
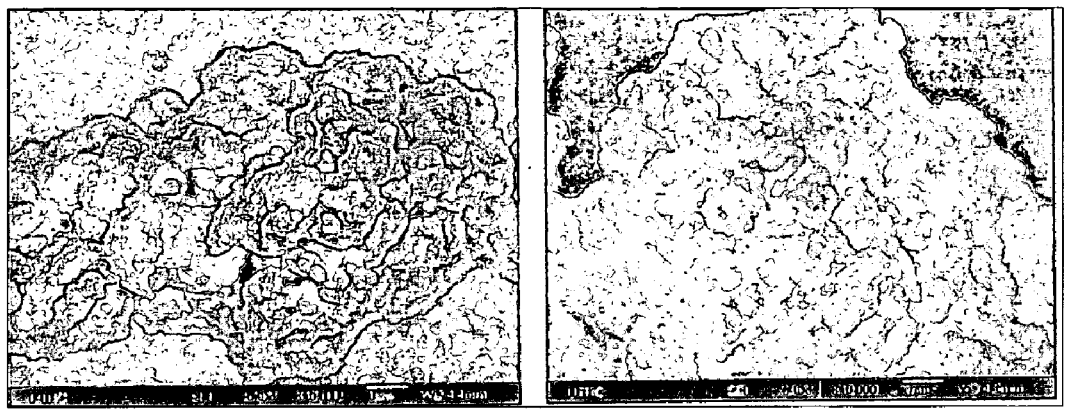
FIG. 2 is a pair of comparative electron micrographs showing the minimal impact of aging time on ceria-zirconia nanocrystalline material in accordance with the invention.

The following example demonstrates how the ceria-zirconia nanocrystalline material described in this invention exhibits similar morphological properties when aged for 15 minutes versus a 7-hour aging period. A $Ce_{0.66}Zr_{0.35}O_2$ catalyst support (Sample UR117) was prepared as described in Example 10 up to the aging process. Samples were collected at various time increments during the aging process, filtered and placed in 2-propanol to exchange the water in the gel with alcohol. The suspensions were placed on specimen grid normally used in conjunction with a Transmission Electron Microscope (TEM) and then analyzed by a High Resolution Scanning Electron Microscopy (HR-SEM). The images taken for both a 15-minute and a 7-hour aging time are given in FIG. 2. The morphology in both cases is the same and therefore any morphological evolution that takes place in solution must do so within the first 15 minutes after the co-precipitation.

EXAMPLE 17

The following example demonstrates how the ceria-zirconia nanocrystalline material described in this invention exhibits a similar surface area despite the amount of aging time. Various ceria-zirconia and doped ceria-zirconia supports were synthesized and their aging time was varied to help elucidate the effect of aging time on surface area. The syntheses were all similar to that described for Example 1 and all supports were calcined between 400-450° C. for anywhere between 2 and 4 hours with a heating rate of either 2 or 10° C./min. The results are given in Table 5.

TABLE 5

| Sample | Composition | Aging Time | Surface Area ($m^2/g$) |
|---|---|---|---|
| UR209 | $Ce_{0.60}Zr_{0.40}O_2$ | 0 minutes | 207 |
| UR215 | $Ce_{0.625}Zr_{0.325}La_{0.05}O_2$ | 10 minutes | 203 |
| UR179 | $Ce_{0.65}Zr_{0.35}O_2$ | 4 hours | 242 |
| UR97 | $Ce_{0.65}Zr_{0.35}O_2$ | 7 hours | 212 |
| UR136b | $Ce_{0.65}Zr_{0.35}O_2$ | 21 hours | 229 |

The La additive in UR215 does not affect significantly the surface area values obtained.

Despite the large difference in aging time, the surface areas achieved were close to being within range of one another. In addition, there is no linear trend and so it is concluded that the aging time has no effect on the resulting surface area. A long aging time of 20 hours offers no benefit over a 4 or 7 hour aging time. In fact, as shown by Sample UR209, for all practical purposes, the aging step can be removed entirely from the synthesis protocol.

For ceria-based mixed-metal oxides that are to be used as catalyst supports and which comprise cerium oxide and typically also zirconium and/or hafnium oxide, it is generally desirable that the oxide possess a cubic structure. The cubic structure is generally associated with greater oxygen mobility, and therefore greater catalytic activity. Moreover, the zirconium and/or hafnium provide thermal stability, and thus contribute to the thermal stability and life of a catalyst. In accordance with an aspect of the invention, it has been determined, by Raman spectroscopy, for example, that the cerium-based oxide made in accordance with the invention exhibits a cubic phase lattice for even relatively high concentrations of dopants such as zirconium and/or hafnium. In recognition and application of that determination, it has been found that the composition of the bulk ceria-based mixed-metal oxide is, advantageously: cerium, between 40% and 85%; zirconium or hafnium, or mixtures thereof, between 15% and 60%; one or members of the group: Ti, Re, Nb, Ta, Mo, W, Rh, Sb, Bi, V, Mn, Co, Cu, Ga, Ca, Sr, and Ba, between 0% and 10%; and one or more members of the group: Y, La, Pr, Nd, Sm, Eu, Gd, Tb, Dy, Ho, Er, Tm, Yb, and Lu, between 0% and 10%; and where all percentages are on a metals-only atomic basis. In accordance with one aspect of the invention, the cerium is between about 40% and 70%, and the zirconium or hafnium, or mixture thereof, is between about 25% and 60% and most preferably is greater than about 45%. Under another aspect of the invention, the cerium may be 60% or more. Moreover, the ceria-based mixed-metal oxides exhibit, via Raman spectroscopy, a cubic structure to the effective exclusion of the tetragonal phase, over all, or at least most, of the compositional range of interest for the several embodiments.

Figure 3:
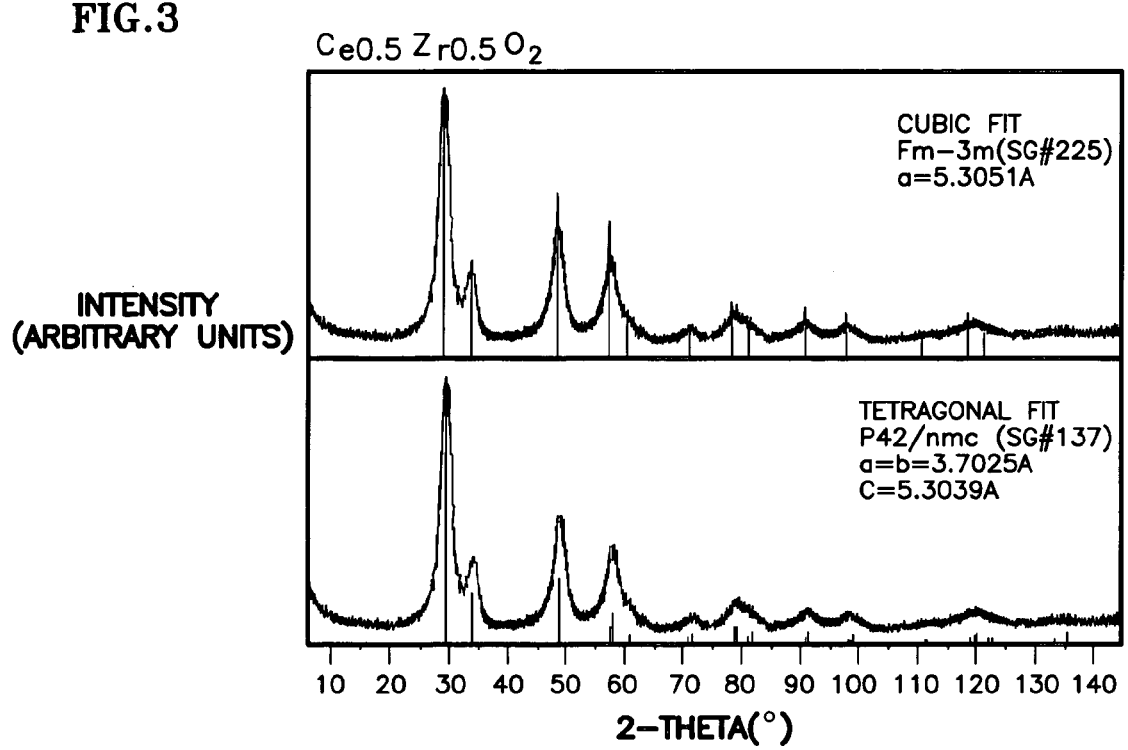
FIG. 3 is a powder X-ray diffraction pattern for a $Ce_{0.5}Zr_{0.5}O_2$ nanocrystalline support material of the invention, fit to both cubic ant tetragonal symmetry.

The Yashima et al. article suggested that above 20 percent zirconia, the oxygen anion lattice distorts into a tetragonal phase, while the cerium and zirconium cations remain in a cubic lattice structure, creating a non-cubic, metastable, pseudo-tetragonal phase lattice. Traditionally, powder X-ray diffraction (PXRD) has been used to identify the structure and symmetry of such phases. However, in the case of ceria-zirconia oxides with very small crystallite sizes (i.e., less than 3 nm), the PXRD signal exhibits broadened peaks. Additionally, the signal produced by the oxygen atoms, which is a function of atomic weight, is drowned out by the intense signal produced by the cerium and zirconium cations. Thus any tetragonal distortion, caused by the oxygen atoms shifting in the lattice, goes unnoticed in a PXRD pattern and the resulting pattern appears cubic. A typical PXRD pattern of a synthesized ceria-zirconia material with crystallite sizes <3 nm, overlaid with ICDD-PDF files fit to both cubic and tetragonal symmetry, respectively is shown in FIG. 3. It is apparent from these spectra that a clear decision cannot be made as to the symmetry of these materials. In such cases, Raman spectroscopy and X-ray absorption fine structure (EXAFS) can be employed to observe such phase transitions.

EXAMPLE 18

Figure 4:
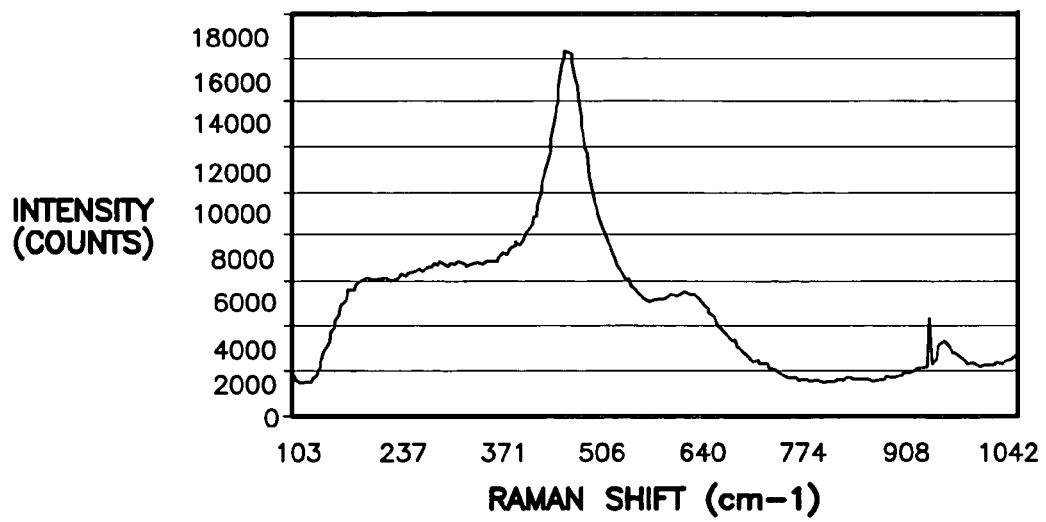
FIG. 4 is a Raman spectra of a $Ce_{0.65}Zr_{0.35}O_2$ nanocrystalline support material in accordance with the invention.

The following example demonstrates how both the ceria-zirconia and ceria-hafnia nanocrystalline materials described in this invention exhibit a cubic structure up to 35% zirconium or hafnium, respectively. Using the synthetic protocol described in Example 1, a high surface area (187 m$^2$/g), nanocrystalline (3.5 nm), large pore (6 nm), ceria-zirconia oxide support is prepared containing 35 atomic percent zirconia (Sample UR68). The Raman spectra is given in FIG. 4. The center peak around 490 cm$^{-1}$ is representative of the Ce—O bond in a cubic lattice and the shoulder peak around 630 cm$^{-1}$ is representative of a structure defect caused by the introduction of Zr or Hf into the Ce lattice. The same behavior was observed for a ceria-hafnia material of similar composition.

EXAMPLE 19

Figure 5:
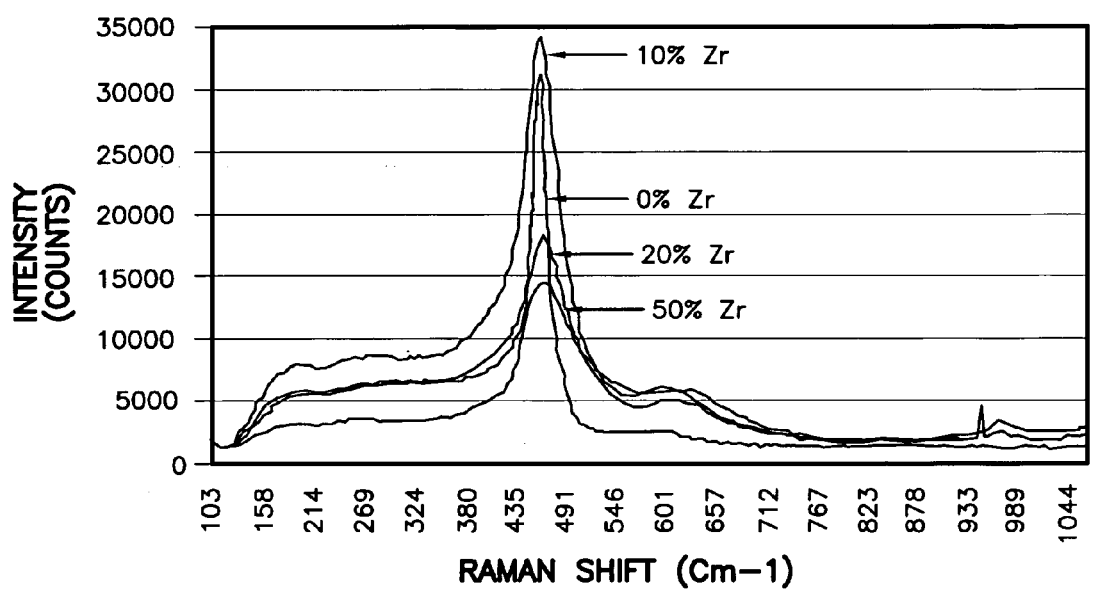
FIG. 5 depicts Raman spectra for each of several levels of zirconia up to 50% in the ceria oxide nanocrystalline support material.

The following examples demonstrate how the ceria-zirconia and ceria-hafnia nanocrystalline materials described in this invention exhibit a cubic structure up to 50% zirconium. Various ceria-zirconia supports were prepared using the same protocol described in Example 1 (Sample UR32, UR33, UR88, and UR128) and are given here as examples to elucidate the effect of doping levels on structure. All supports were calcined between 400-500° C. for anywhere between 2 and 4 hours with a heating rate of either 2 or 10° C./min. The Raman spectra for the ceria-zirconia materials are shown in FIG. 5. The results are similar to that given in Example 18. All spectra exhibit the cubic peak around 490 cm$^{-1}$ and no peaks representative of the tetragonal phase are detected. The same behavior was observed for the ceria-hafnia materials described in this invention.

EXAMPLE 20

Figure 6:
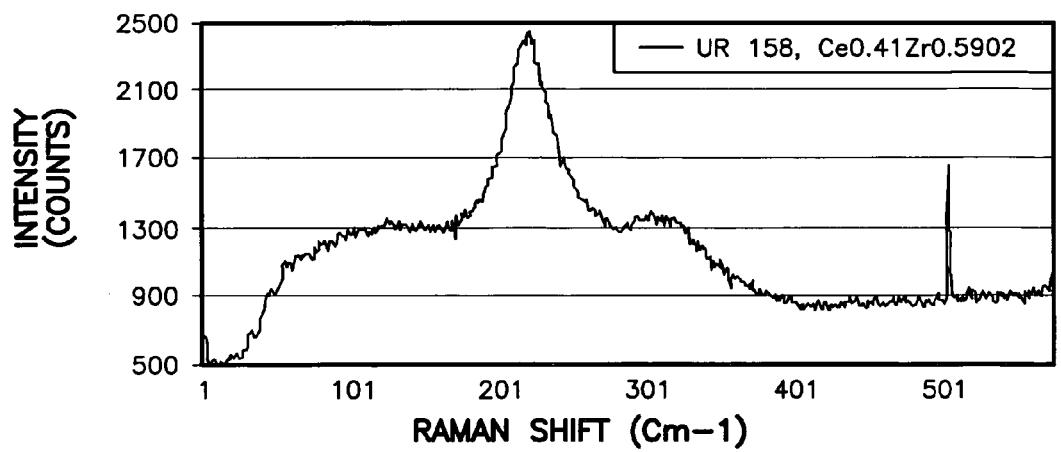
FIG. 6 is a Raman spectra of a $Ce_{0.41}Zr_{0.59}O_2$ support material indicating the absence of the tetragonal phase.

The following example demonstrates how the ceria-zirconia nanocrystalline materials described in this invention exhibit a cubic structure up to 59 mol % zirconium. A $Ce_{0.41}Zr_{0.59}O_2$ support material (Sample UR158) was prepared as described in Example 1 with the modification that the amount of $(NH_4)_2Ce(NO_3)_6$ and $ZrO(NO_3)_2.xH_2O$ was 16.86 and 11.98 g respectively, and the calcination temperature was 400° C. instead of 450° C. The Raman spectra shown in FIG. 6 gives a cubic peak around 490 cm$^{-1}$ and no peaks representation of the tetragonal phase was detected.

EXAMPLE 21

Figure 7:
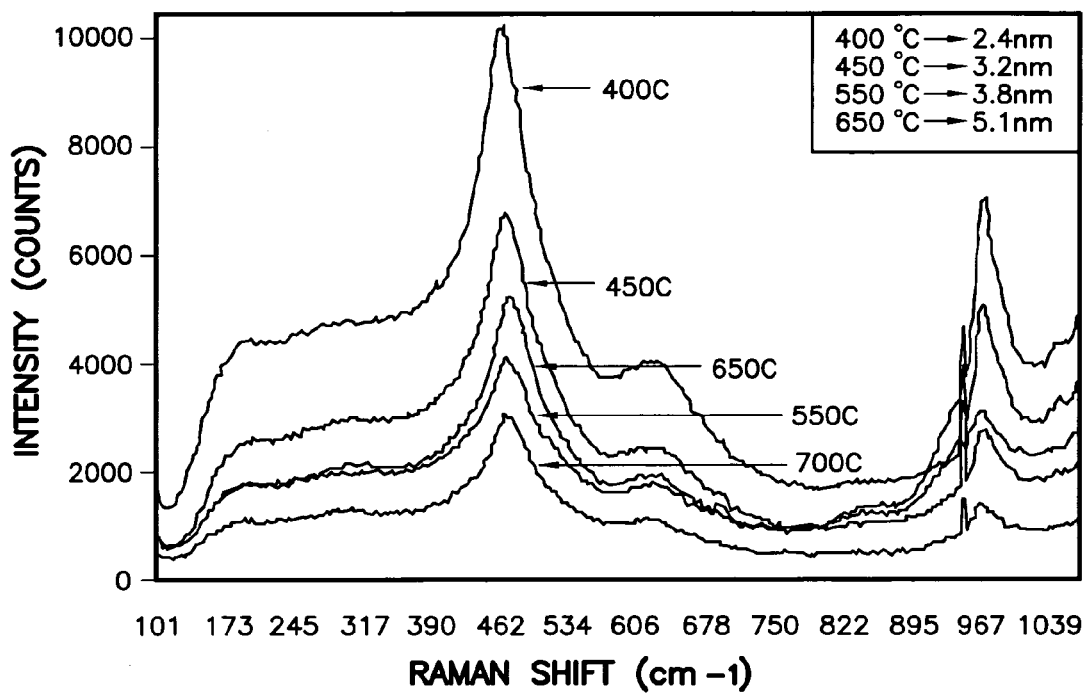
FIG. 7 depicts Raman spectra for ceria-zirconia nanocrystalline support material of the invention prepared at various calcination temperatures.

This example demonstrates how the ceria-zirconia nanocrystalline material described in this invention exhibit a cubic structure at 35% zirconium when calcined at temperatures up to 800 C. Two ceria-zirconia supports were prepared using the same protocol described in Example 1. The first material (Sample UR68) has the composition $Ce_{0.65}Zr_{0.35}O_2$. The second material (Sample UR86) has the composition $Ce_{0.68}Zr_{0.32}O_2$. These two compositions are considered as sufficiently close that a comparison can be made between the data. Sample UR68 was calcined at 400° C. and 700° C., while Sample UR86 was calcined at 450° C., 550° C., and 650° C. The Raman spectra for the ceria-zirconia materials are shown along with the corresponding crystallite sizes in FIG. 7. All spectra retained the cubic peak around 490 cm$^{-1}$ and no peaks representative of the tetragonal phase are detected.

EXAMPLE 22

Figure 8:
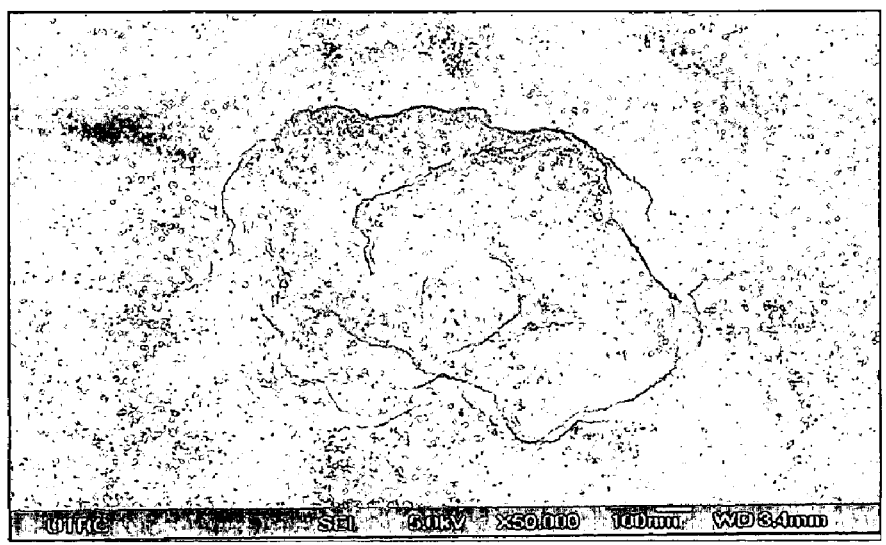
FIG. 8 is an electron micrograph displaying the fractal morphology of nanocrystalline ceria-zirconia material in accordance with the invention.

The following example demonstrates how a ceria-zirconia nanocrystalline material described in this invention exhibits a fractal morphology thus leading to a minimization in internal mass transfer resistance. Within the context of a nanoscale material, a pattern formed within an aggregate that is regular and repeating at increasing magnitudes of scale can be considered as fractal. Having a fractal structure eliminates the need to design a catalyst material with very large pore structures. If fractal, the material possesses larger, 100 to 200 nm and micron-sized pores in the aggregate (inter-particle void space, as opposed to intra-particle void space described earlier as forming the 4-9 nm average diameter pores) which provide enough open space for gas molecules to diffuse in and react. By reducing the internal pore diameter (i. e., the inter-particle void space) to a smaller size, the internal surface area may be increased, leading to a larger number of active sites per volume and a thus a higher catalytic activity. FIG. 8 shows an electron micrograph of the nanocrystalline ceria-zirconia material (Sample UR117) as described in the invention, highlighting its fractal morphology.

Attention is now given to the facet of the invention concerned with loading a highly dispersed catalyst metal on the mixed metal oxide support just described, including the associated process and the resulting product. Although the following discussion and examples will use Pt (platinum) as the catalyst metal loaded on the support, it will be understood that other metals, and particularly noble metals, are well-suited alternatives to Pt, such as Pd, Rh, Ir, Ru, and Os, as well as alloys or mixed metal clusters containing noble metal including Group 1B metals and/or Re. Further attention will be given hereinafter to the advantage of including Re with Pt. The highly dispersed platinum, that is, Pt crystallites that are typically less than 3 nm in diameter, preferably less than 2.5 nm in diameter, and most preferably less than 2 nm in diameter, as applied to the mixed-metal oxide support of the invention and in the manner and formulation of the invention, has a concentration in the range from about 0.1 to about 6.0% by weight, as metal, based on the final weight of the dried oxide support. While "low" metal loadings below about 1.0 wt % may be acceptable or even desirable in some situations, such as catalyst use at temperatures above 400° C., high loadings of about 4 to 6 wt % may be needed to obtain the desired catalytic activity and life time at lower temperatures, for instance 200° C. Such loading of a catalyst, such as Pt, on a large surface area, ceria-based support results in a catalyst that is particularly effective and efficient for use in WGS and PROX reactions.

To load the highly dispersed platinum on the support, several steps are involved, two of which are particularly important to the invention. Those important steps include, firstly, surface treating the ceria-based support and secondly, selecting an/the appropriate formulation for loading the support. A preliminary step, which may also be accomplished as a final step in the formation of the support, involves forming the oxide into a suitable form. This form may be that of a fine powder (<200 mesh), 50 to 100 mesh granules, extrudates, pellets, with or without added binder extrusion aides, etc., or a wash-coat or other coating on a ceramic or metallic monolith, foam or wire mesh, again with or without a suitable binder.

The 50-200 mesh, ceria-based mixed-metal oxide support particles, preparatory to being metal-loaded, undergo surface treatment by being heated in an acid solution containing one or more acids from the group consisting of amino acids, hydroxy dicarboxylic acids, hydroxy polycarboxylic acids and keto carboxylic acids, of which citric acid from the hydroxy polycarboxylic acid group and malic acid from the hydroxy dicarboxylic acid group are preferred, with malic acid being particularly preferred. These acids are selected to provide a mild reaction and serve to react with the oxide surface, forming sites that bind noble metal-containing cations such as $[Pt(NH_3)_4]^{+2}$. It is believed that these sites are sufficiently separated from each other as to yield, after either calcinations, calcinations and reduction, or reduction, very high noble metal dispersion, that is noble metal particles typically less than 2.5 nm. The support particles are heated in an alcohol solution, typically of ethanol, containing a selected acid, such as malic or citric acid, at about 50° C. for 2-3 hours. The support particles are then rinsed with ethanol until a pH greater than 4 is attained.

After the surface treatment rinse, the support particles are submerged or immersed in a suitable solution containing the catalyst metal, in this instance a tetraamineplatinum (II) nitrate solution, ammonia hydroxide and propanol, for 2-3 hours at room temperature. Tetraamineplatinum (II) nitrate or analogous salts of other noble metals are usually chosen because they provide sufficiently stable, soluble noble metal cations to react with the treated surface, are halogen or sulfur free, are available at a reasonable cost, and on further treatment such as calcination smoothly decompose leaving no unwanted residue. Tetraamineplatinum (II) chloride, bromide, etc. would work but they contain halogens. For some noble metals, like Pd, other ligands like ethanolamine can be substituted for ammonia, and the resulting water containing solution contains a mixture of complexes of the type $M(II) [(NH_3)_{4-(x+n)}(ethanolamine)_x(H_2O)_n]$, where x+n is equal to or less than 4. Care must also be taken that the noble metal salt chosen doesn't undergo either spontaneous or light induced redox reactions causing the noble metal to come out of solution.

Thereafter, the support particles are filtered through a 10 μm membrane filter and vacuum dried overnight (about 16 hours). Finally, the dried and metal-loaded catalyst support is calcined at a temperature in the range of 350°-500° C. for about 3-4 hours at a heating rate of about 2° C./min, to provide the finished catalyst. The essence of this phase of the process is to convert the metal-loaded protocatalyst to a stable form, through some appropriate combination of drying, calcining and/or reduction.

Following are 5 examples (23-28) in which the above-described process, or some variants thereof, are described in detail for illustrative and comparative purposes, however it will be understood that these examples are not intended to be limiting.

EXAMPLE 23

The following is an example demonstrating the method for loading the noble metal on to a ceria-zirconia nanocrystalline support material, as described in this invention, and the resulting properties. A $Ce_{0.65}Zr_{0.35}O_2$ catalyst support is prepared substantially identically to that of Example 1 above, except that it is calcined at 400° C., rather than at 450° C. One gram of the support, comminuted to a 50-200 mesh size, is heated in 5 mL of ethanol solution containing 0.1 g/mL of citric acid at 50° C. for 2 hours. The support is then rinsed with ethanol until the pH is greater than (>) 4. After that rinse, the support is submerged or immersed in 3.8 g of tetraamineplatinum (II) nitrate solution for 2 hours at room temperature. The tetraamineplatinum (II) nitrate solution contains 1.01 wt % Pt, 1 wt % ammonia hydroxide, and 15 wt % 2-propanol. The support is then filtered through a 10 μm Teflon® membrane filter and vacuum dried overnight (about 16 hours) at 70° C. The loaded support is then calcined at 450° C., a temperature somewhat greater than that for calcining the support material itself, for about 4 hours with a heating rate of about 20° C./min. ICP analysis has determined the platinum loading to be 2.4 wt %, and the surface area to be 170-180 $m^2/g$.

A $Ce_{0.65}Zr_{0.35}O_2$ sample made similar to Example 1 was seen to have a surface area of 186 $m^2/g$, an average pore size of 6.82 nm, crystallite size of 3.5 nm, and pore volume of 0.32 $cm^3/g$. This sample was loaded with 1.8 wt % of Pt, dried, calcined, reduced, and passivated. It was seen to be a very active water gas shift catalyst. A microtomed section of this catalyst was examined by high resolution transmission electron microscopy (TEM), and revealed a nanocrystalline, porous microstructure of randomly oriented grains. The TEM observations corroborated the crystallite size and average pore size data, determined by powder x-ray diffraction and BET techniques respectively. No regions identifiable as crystalline Pt were identified in either bright field or dark field TEM images or in electron diffraction patterns. After Fourier transform image processing was used to remove the $Ce_{0.65}Zr_{0.35}O_2$ {111} and {200} lattice fringes from the image, a few regions about 2 nm in size were evident, which had a lattice fringe spacing consistent with Pt {111}. The scarcity of such images, when compared to the known Pt content of this material suggested that the majority of Pt crystallites had to be less than 2.5 nm, and typically less than about 1.5-2.0 nm in size.

COMPARATIVE EXAMPLE 24

The following is an example of Pt loading without surface treatment. 5.59 g of a $CeO_2$ support (calcined at 400° C., with 50-200 mesh size) is submerged in 21.6 mL of tetraamineplatinum (II) nitrate solution for more than 48 hours at room temperature. A vacuum is applied when the support is first added to the solution. The solution is stirred for the first 5-10 minutes, and is then stirred occasionally during the course of submergence. The tetraamineplatinum (II) nitrate solution contains 1.04 wt % Pt, 1 wt % ammonia hydroxide, and 15 wt % 2-propanol. The support is filtered through a 10 μm Teflon membrane filter and vacuum dried at 70° C. overnight. The loaded support is then calcined at 450° C. for about 4 hours with a heating rate of 2° C./min. The platinum loading was analyzed by ICP and seen to be only 0.56 wt %, thus showing that the platinum loading is very low without surface treatment.

EXAMPLE 25

The following is an example of a Pt loaded ternary ceria-based mixed-metal oxide where the dopant is a rare-earth metal. A $Ce_{0.625}Zr_{0.325}Pr_{0.05}O_2$ catalyst support (Sample UR35) was synthesized as described in Example 4 with the modification that the extrudate is calcined at 400° C. instead of 500° C. 1 g of that $Ce_{0.625}Zr_{0.325}Pr_{0.05}O_2$ support (50-200 mesh size) is heated in 5 mL of an ethanol solution containing 0.05 g/mL of citric acid at 50° C. for 3 hours. The support is then rinsed with ethanol until the pH is greater than (>) 4. After that rinse, the support is submerged or immersed in 3.8 g of a tetraamineplatinum (II) nitrate solution for 2 hours at room temperature, with occasional stirring. The tetraamineplatinum (II) nitrate solution contains 1.01 wt % Pt, 1 wt % ammonia hydroxide, and 15 wt % 2-propanol. The support is then filtered through a 10 μm Teflon® membrane filter and vacuum dried overnight (about 16 hours) at 70° C. The loaded support is then calcined at 450° C., a temperature somewhat greater than that for calcining the support material itself, for about 4 hours with a heating rate of about 2° C./min. The platinum loading was determined to be 2.46 wt %, and the catalyst surface area is 193 $m^2/g$. The oxide crystallite size was determined by powder x-ray diffraction to be 3 nm. High platinum dispersion is indicated by powder x-ray diffraction failing to detect any Pt or PtO because of its small crystallite size and confirmed by chemisorption techniques.

COMPARATIVE EXAMPLE 26

The following is an example of a Pt loaded ceria-zirconia support where the dopant is a rare-earth metal and the surface treatment is not used. 5.8 g of a $Ce_{0.625}Zr_{0.325}Pr_{0.05}O_2$ catalyst support, prepared substantially identically to Example 4 above except that it was calcined at 400° C. rather than 500° C., is submerged in 22.1 g of tetraamineplatinum nitrate solution for more than 48 hours at room temperature, with occasional stirring. The tetraamineplatinum (II) nitrate solution contains 1.07 wt % Pt, 1 wt % ammonia hydroxide, and 15 wt % 2-propanol. The support is then filtered through a 10 μm Teflon® membrane filter and vacuum dried overnight (about 16 hours) at 70° C. The loaded support is then calcined at 450° C., a temperature somewhat greater than that for calcining the support material itself, for about 4 hours with a heating rate of about 2° C./min. Platinum loading was determined to be 1.5 wt %. This example again indicates that without the surface treatment, Pt loading continues to be low.

EXAMPLE 27

The following is yet another example of a Pt-loaded ternary ceria-based mixed-metal oxide where the dopant is a rare-earth metal. Four g of $Ce_{0.625}Zr_{0.325}Pr_{0.05}O_2$ support (calcined at 400° C., with 50-200 mesh size) is heated in 20 mL ethanol solution of 0.07 g/mL malic acid at 50° C. for 3 h. The support is then rinsed with ethanol until pH>4. After rinse, the support was submerged in 10.27 g of tetraamineplatinum (II) nitrate solution for 2 h at room temperature. The solution was stirred occasionally during the course of 2 hours. The tetraamineplatinum (II) nitrate solution contained 1.03 wt % Pt, 1 wt % ammonia hydroxide and 15 wt % 2-propanol. The support was filtered through a 10 μm teflon membrane filter and vacuum dried at 70° C. overnight. It was then calcined at 450° C. for 4 h with a heating rate of 2° C./min. Platinum loading is 2.35 wt %. High platinum dispersion is indicated by the absence of Pt or PtO being observed by X-ray diffraction due to its small crystallite size.

In accordance with an aspect of the catalyst loading process of the invention, it has been found to be particularly desirable to carefully tailor the surface treating (etch) step to the acid being used and the particular composition of the ceria-based mixed-metal oxide support, in order to accomplish the desired etch without excessive degradation of the oxide support material. This is particularly desirable for obtaining accurate, reliable and reproducible catalyst loadings on nanocrystalline complex mixed metal oxides with surface areas greater than 200 $m^2/g$. In this regard, the nanocrystalline mixed metal oxide is first titrated with the acid to be used in order to establish a titration curve having an equivalence point at which the pH stabilizes despite the continued addition of the titrant acid. The titration curve, or a family of such curves for differing acids and/or support materials, is then used to optimize the etch process by selecting the quantity of acid determined by the equivalence point.

EXAMPLE 28

Figure 9:
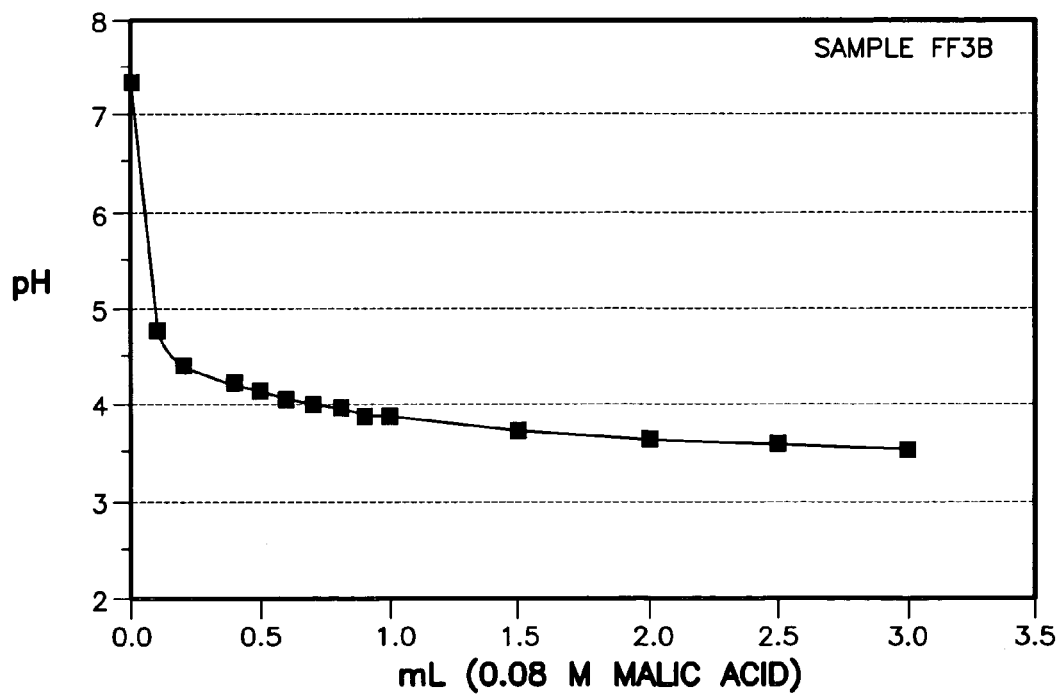
FIG. 9 is a titration curve for Sample FF3B of Example 28.

The following example demonstrates the invention's applicability for Platinum loading a high surface area, high zirconia content, cubic phase, ceria-zirconia nanocrystalline material. A $Ce_{0.50}Zr_{0.50}O_2$ catalyst support (Sample FF3B) was synthesized according to the method described in Example 1, providing for different compositions. The resulting material, calcined at 380° C. in a $CO_2/O_2$ environment and giving a surface area of 248 $m^2/g$, was prepared for titration by adding 0.5 g of the support, comminuted to mesh size less than 120, to 100 mL ethanol. A solution of 0.08 M malic acid dissolved in ethanol was used to titrate the catalyst support by adding intervals of 0.1 mL until the equivalence point is sufficiently achieved (until the pH does not change significantly with each addition of acid titrant). The titration curve is given in FIG. 9. The optimum amount was determined to be 2 mL/g support. Based on this finding, 2.51739 g of the catalyst support, comminuted to a 80-120 mesh size, was heated in 5 mL of a 0.08 M malic acid/ethanol solution (as determined by titration) at 50° C. for 15 minutes. The catalyst support was then washed thoroughly with ethanol, until the pH is greater than 4. After the rinse, the catalyst is dried and immersed in 10.0819 g of a 0.97% Platinum solution by weight for 2 hours at room temperature. The Platinum solution consisted of 1.14410 g tetraammineplatinum nitrate, 1% by weight ammonia hydroxide and 15% by weight isopropanol (the balance is de-ionized water). The support was then filtered through a 10 μm Teflon® membrane filter and vacuum-dried overnight (16 hours) at 70° C. ICP results confirmed a loading of 2.08% Platinum. Thus, Example 28 shows that with the optimized loading procedure, including titration, a 50/50% by weight ceria zirconia material is precisely loaded with Platinum

EXAMPLE 29

Figure 10:
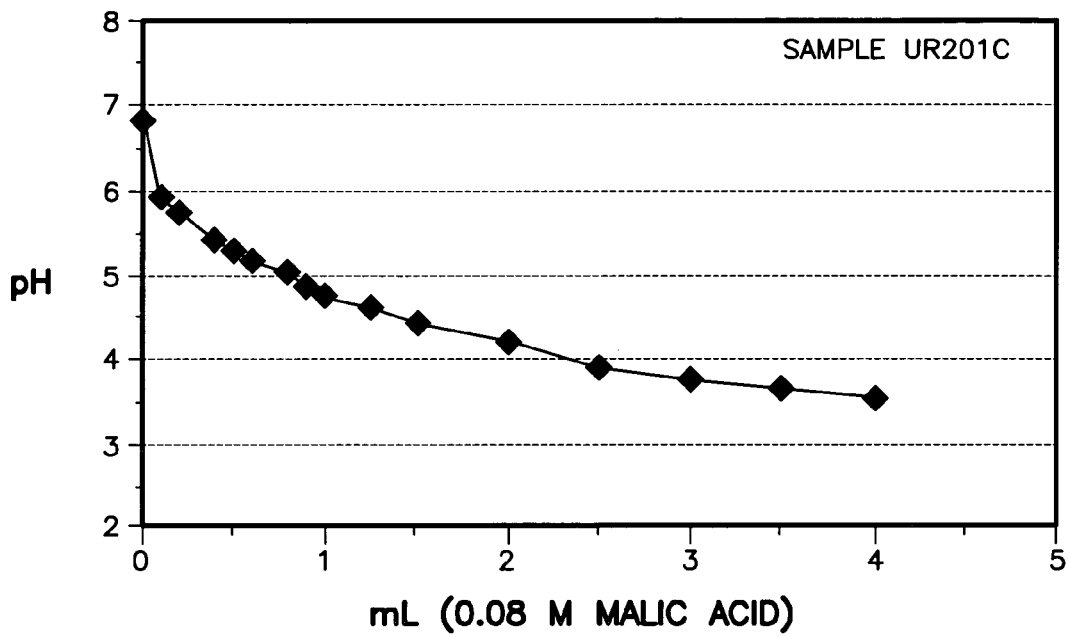
FIG. 10 is a titration curve for Sample UR201C of Example 29.

The following example demonstrates the invention's applicability for loading a high surface area, cubic phase, ceria-zirconia nanocrystalline material prepared under optimized calcination conditions. A $Ce_{0.58}Zr_{0.42}O_2$ catalyst support (sample UR201C) was synthesized according to the method described in Example 1, providing for different compositions. The resulting material was calcined at 380° C. in a $CO_2/O_2$ environment and gave a surface area of 218 $m^2/g$. The calcined material was prepared for titration by adding 0.5 g of the support, comminuted to mesh size less than 120, to 100 mL ethanol. A solution of 0.08 M malic acid dissolved in ethanol was used to titrate the catalyst support by adding intervals of 0.1 mL until the equivalence point is sufficiently achieved (until the pH does not change significantly with each addition of acid titrant). The titration curve is given in FIG. 10. The optimum amount was determined from this to be 1 mL/g support. Based on this finding, 1.1161 g of the catalyst support, comminuted to a 80-120 mesh size, was heated in 2 mL of a 0.08 M malic acid/ethanol solution at 50° C. for 15 minutes. The catalyst support was then washed thoroughly with ethanol, until the pH is greater than 4. After the rinse, the catalyst was dried and immersed in 3.3538 g of a 1.03% Platinum solution by weight for 2 hours at room temperature. The Platinum solution consisted of 2.5896 g tetraammineplatinum nitrate, 1% by weight ammonia hydroxide and 15% by weight isopropanol (the balance is de-ionized water). The support was then filtered through a 10 μm Teflon® membrane filter and vacuum-dried overnight (16 hours) at 70° C. The loaded catalyst was then calcined at 380° C. in static air for 4 hours, with a heating ramp of 2° C./min. ICP results confirmed a loading of 2.09% Platinum.

COMPARATIVE EXAMPLE 30

The following example demonstrates platinum loading of a ceria-zirconia support with identical composition to that in Example 28 but not following the procedure described in this invention. 6.7092 g of catalyst support with a composition of $Ce_{0.58}Zr_{0.42}O_2$ (Sample UR120B) was synthesized according to the method described in Example 1, providing for different compositions. The resulting material, calcined at 400° C. in static air and with a surface area of 270 $m^2/g$, is submerged in 33.5 mL of a 0.53 M malic acid/ethanol solution for 3 hours at 50° C. The catalyst support is then washed thoroughly with ethanol, until the pH is greater than 4. After the rinse, the catalyst is dried and immersed in 26.4724 g of a 1.02% Platinum solution by weight for 2 hours at room temperature. The platinum solution consists of 0.7685 g tetraammineplatinum nitrate, 1% by weight ammonia hydroxide and 15% by weight isopropanol (the balance is de-ionized water). The support is then filtered through a 10 μm Teflon® membrane filter and vacuum-dried overnight (15 hours) at 70° C. The loaded catalyst was then calcined at 400° C. in static air for 4 hours, with a heating ramp of 2° C./min. ICP results confirmed a loading of 2.80% Platinum, thus showing that the Platinum loading is very high without the optimized surface treatment, including titration.

EXAMPLE 31

Figure 11:
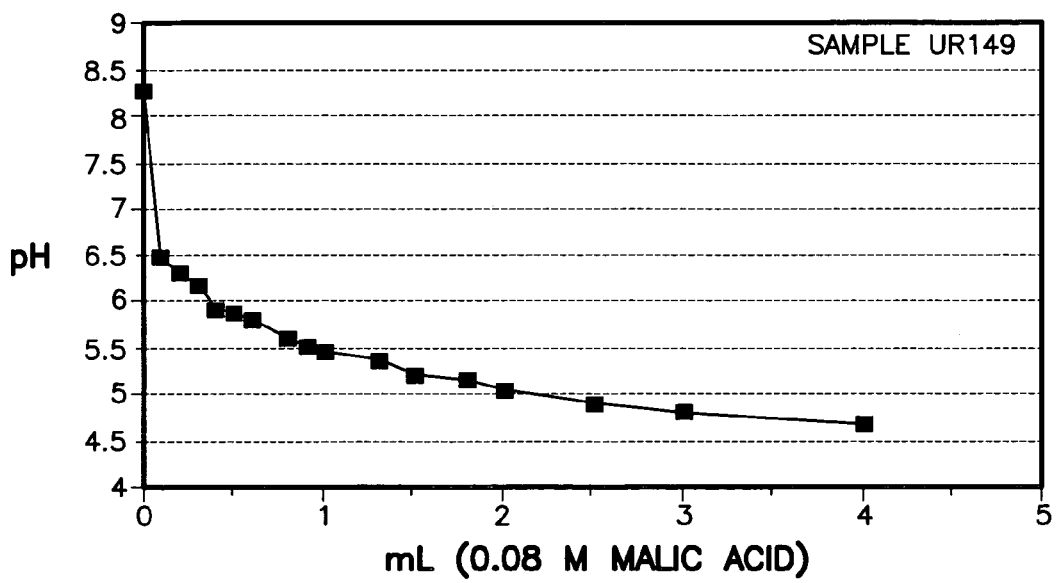
FIG. 11 is a titration curve for Sample UR149 of Example 31.

This example demonstrates the invention's applicability for loading a high surface area, cubic phase, ceria-hafnia nanocrystalline material. $Ce_{0.65}Hf_{0.35}O_2$ catalyst support (Sample UR149) was prepared was synthesized according to the method described in Example 9, providing for different compositions. The resulting material, calcined at 400° C. in static air and giving a surface area of 170 $m^2/g$, was prepared for titration by adding 0.5 g of the support, comminuted to mesh size less than 120, to 100 mL ethanol. A solution of 0.08 M malic acid dissolved in ethanol is used to titrate the catalyst support by adding intervals of 0.1 mL until the equivalence point is sufficiently achieved (until the pH does not change significantly with each addition of acid titrant). The titration curve is given in FIG. 11. The optimum amount was determined to be 4 mL/g support. Based on this finding, 1.6928 g of the catalyst support, comminuted to a 80-120 mesh size, was heated in 6 mL of a 0.08 M malic acid/ethanol solution (4ml/g) at 50° C. for 15 minutes. The catalyst support is then washed thoroughly with ethanol, until the pH is greater than 4. After the rinse, the catalyst is dried and immersed in 6.7859 g of a 0.92% Platinum solution by weight for 2 hours at room temperature. The Platinum solution consists of 1.3022 g tetraammineplatinum nitrate, 1% by weight ammonia hydroxide and 15% by weight isopropanol (the balance is de-ionized water). The support is then filtered through a 10 μm Teflon® membrane filter and vacuum-dried overnight (15 hours) at 70° C. The loaded catalyst was then calcined at 380° C. in static air for 4 hours, with a heating ramp of 2° C./min. ICP results confirmed a loading of 2.08% Platinum. Thus, following the surface treatment described in this invention, precise loading is achieved for ceria systems that include Hafnium.

COMPARATIVE EXAMPLE 32

The following example demonstrates Platinum loading of a support with identical composition to that in Example 31 but not following the procedure described in this invention. 5.2969 g of a catalyst support of $Ce_{0.65}Hf_{0.35}O_2$ composition (Sample UR94), prepared according to Example 29, comminuted to a 60-200 mesh size, calcined at 400° C. in static air, and having a surface area of 180 $m^2/g$ was submerged in 10 mL of a 0.53 M malic acid/ethanol solution for 3 hours at 50° C. The catalyst support is then washed thoroughly with ethanol, until the pH is greater than 4. After the rinse, the catalyst is dried and immersed in 19.3650 g of a 1.07% Platinum solution by weight for 2 hours at room temperature. The Platinum solution consists of 1.1361 g tetraammineplatinum nitrate, 1% by weight ammonia. hydroxide and 15% by weight isopropanol (the balance is de-ionized water). The support is then filtered through a 10 μm Teflon® membrane filter and vacuum-dried overnight (15 hours) at 70° C. The loaded catalyst was then calcined at 400° C. in static air for 4 hours, with a heating ramp of 2° C./min. ICP results confirmed a loading of 2.75% Platinum, thus showing that the Platinum loading is also very high for the ceria systems with hafnium without the optimized surface treatment, including titration.

EXAMPLE 33

Figure 12:
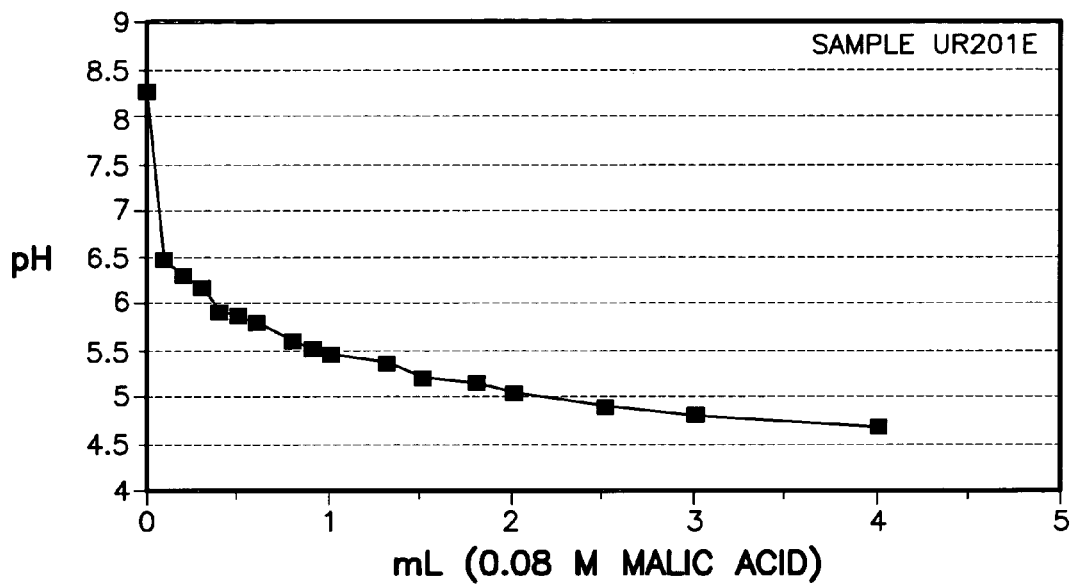
FIG. 12 is a titration curve for Sample 201E of Example 33.

The following example demonstrates the invention's applicability for loading Platinum at higher levels on a high surface area, cubic phase, ceria zirconia nanocrystalline material. A $Ce_{0.58}Zr_{0.42}O_2$ catalyst support (Sample UR201E) was synthesized according to the method described in Example 1, providing for different compositions. The resulting material, calcined at 380° C. in a $CO_2/O_2$ environment, and with a surface area of 218 $m^2/g$, was prepared for titration by adding 0.5 g of the support, comminuted to mesh size less than 120, to 100 mL ethanol. A solution of 0.08 M malic acid dissolved in ethanol was used to titrate the catalyst support by adding intervals of 0.1 mL until the equivalence point is sufficiently achieved (until the pH does not change significantly with each addition of acid titrant). The titration curve is given in FIG. 12. The optimum amount was determined to be 2 mL/g support. Based on this finding, 1.1111 g of the catalyst support, comminuted to a 80-120 mesh size, was heated in 2 mL of a 0.08 M malic acid/ethanol solution at 50° C. for 15 minutes. The catalyst support was then washed thoroughly with ethanol, until the pH is greater than 4. After the rinse, the catalyst was dried and immersed in 10.0165 g of a 1.03% Platinum solution by weight for 2 hours at room temperature. The Platinum solution consisted of 2.5896 g tetraammineplatinum nitrate, 1% by weight ammonia hydroxide and 15% by weight isopropanol (the balance is de-ionized water). The support was then filtered through a 10 μm Teflon® membrane filter and vacuum-dried overnight (16 hours) at 70° C. The loaded catalyst was then calcined at 380° C. in static air for 4 hours, with a heating ramp of 2° C./min. ICP results confirmed a loading of 4.14% Platinum, thus showing the invention is applicable to high Platinum loadings.

EXAMPLE 34

Figure 13:
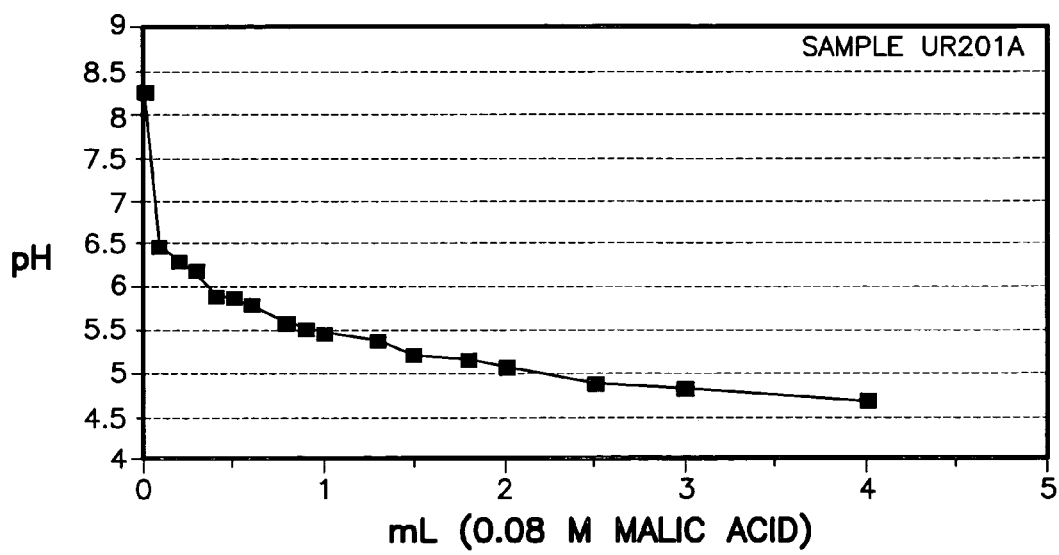
FIG. 13 is a titration curve for Sample UR201A of Example 34.

The following example demonstrates the invention's applicability for loading platinum at lower levels on a high surface area, cubic phase, ceria zirconia nanocrystalline material. A $Ce_{0.58}Zr_{0.42}O_2$ catalyst support (Sample UR201A) was synthesized according to the method described in Example 1, providing for different compositions. The resulting material, calcined at 380° C. in a $CO_2/O_2$ environment and with a surface area of 218 $m^2/g$, was prepared for titration by adding 0.5 g of the support, comminuted to mesh size less than 120, to 100 mL ethanol. A solution of 0.08 M malic acid dissolved in ethanol was used to titrate the catalyst support by adding intervals of 0.1 mL until the equivalence point is sufficiently achieved (until the pH does not change significantly with each addition of acid titrant). The titration curve is given in FIG. 13. The optimum amount was determined to be 2 mL/g support. Based on this finding, 1.0831 g of the catalyst support, comminuted to a 80-120 mesh size, was heated in 2 mL of a 0.08 M malic acid/ethanol solution at 50° C. for 15 minutes. The catalyst support was then washed thoroughly with ethanol, until the pH is greater than 4. After the rinse, the catalyst is dried and immersed in 1.1124 g of a 1.03% Platinum solution by weight for 2 hours at room temperature. The Platinum solution consisted of 2.5896 g tetraammineplatinum nitrate, 1% by weight ammonia hydroxide and 15% by weight isopropanol (the balance is de-ionized water). The support was then filtered through a 10 μm Teflon® membrane filter and vacuum-dried overnight (16 hours) at 70° C. The loaded catalyst was then calcined at 380° C. in static air for 4 hours, with a heating ramp of 2° C./min. ICP results confirmed a loading of 0.87% Platinum, thus showing the invention is applicable to low Platinum loadings.

EXAMPLE 35

Figure 14:
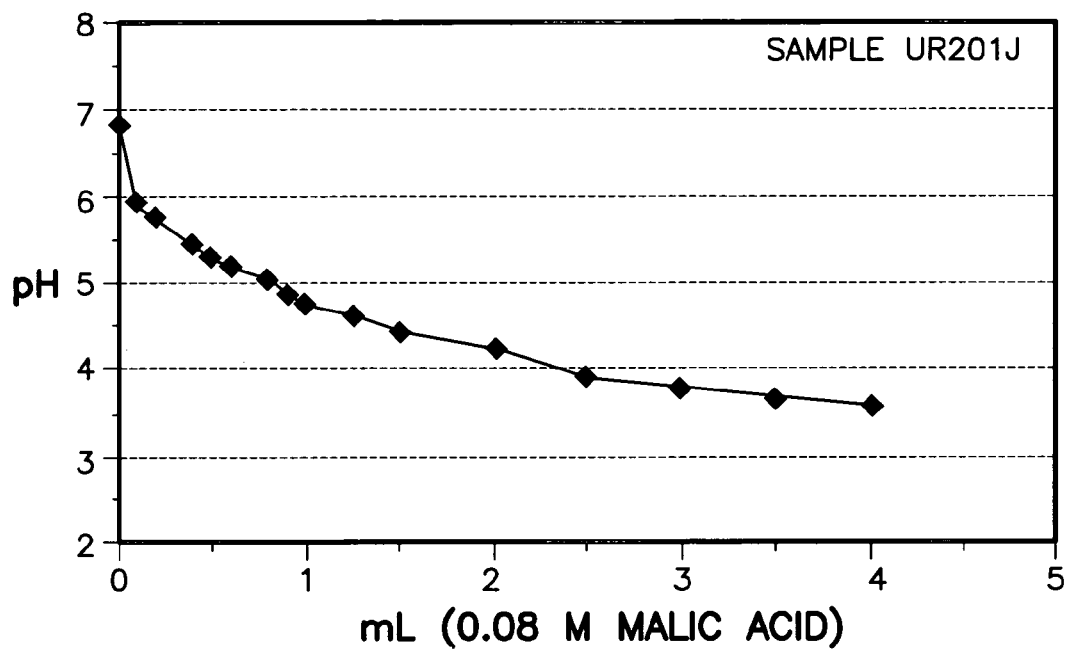
FIG. 14 is a titration curve for Sample UR201J of Example 35.

The following example demonstrates the invention's applicability for loading Palladium at lower levels on a high surface area, cubic phase, ceria zirconia nanocrystalline material. A $Ce_{0.58}Zr_{0.42}O_2$ catalyst support (Sample UR201J) was synthesized according to the method described in Example 1, providing for different compositions. The resulting material, calcined at 380° C. in a $CO_2/O_2$ environment and having a surface area of 218 $m^2/g$, was prepared for titration by adding 0.5 g of the support, comminuted to mesh size less than 120, to 100 mL ethanol. A solution of 0.08 M malic acid dissolved in ethanol was used to titrate the catalyst support by adding intervals of 0.1 mL until the equivalence point is sufficiently achieved (until the pH does not change significantly with each addition of acid titrant). The titration curve is given in FIG. 14. The optimum amount was determined to be 2 mL/g support. Based on this finding, 1.0951 g of the catalyst support, comminuted to a 80-120 mesh size, was heated in 2 mL of a 0.08 M malic acid/ethanol solution (2 ml/g) at 50° C. for 15 minutes. The catalyst support was then washed thoroughly with ethanol, until the pH is greater than 4. After the rinse, the catalyst was dried and immersed in 10.3980 g of a 0.45% Palladium solution by weight for 2 hours at room temperature. The Palladium solution consists of 5.0600 g of a 10% by weight solution of tetraamminepalladium nitrate, 1% by weight ammonia hydroxide and 15% by weight isopropanol (the balance is de-ionized water). The support is then filtered through a 10 μm Teflon® membrane filter and vacuum-dried overnight (18 hours) at 70° C. The loaded catalyst was then calcined at 380° C. in static air for 4 hours, with a heating ramp of 2° C./min. ICP results confirmed a loading of 2.09% Palladium, thus showing that the invention is applicable for achieving precise Palladium loadings.

EXAMPLE 36

Figure 15:
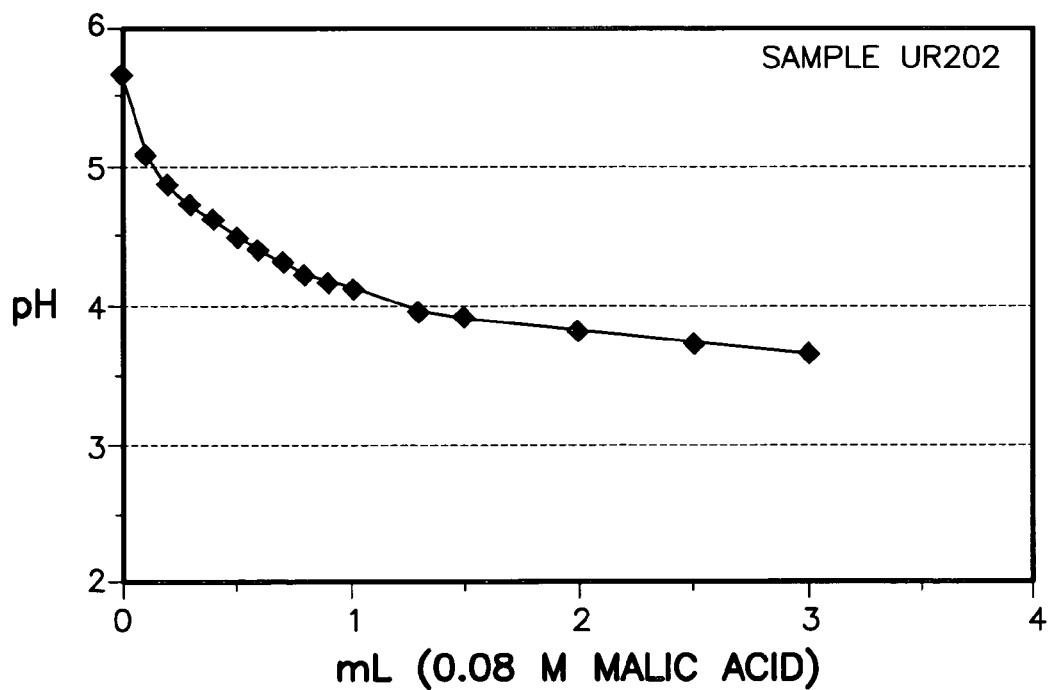
FIG. 15 is a titration curve for Sample UR202 of Example 36.

The following example demonstrates the invention's applicability for loading platinum on a high surface area, cubic phase, molybdenum-doped ceria zirconia nanocrystalline material A $Ce_{0.585}Zr_{0.315}Mo_{0.10}O_2$ catalyst support (Sample UR202) was synthesized according to the method described in Example 6. The resulting material, calcined at 400° C. in static air and with a surface area of 212 $m^2/g$, was prepared for titration by adding 0.5 g of the support, comminuted to mesh size less than 120, to 100 mL ethanol. A solution of 0.08 M malic acid dissolved in ethanol is used to titrate the catalyst support by adding intervals of 0.1 mL until the equivalence point is sufficiently achieved (until the pH does not change significantly with each addition of acid titrant). The titration curve is given in FIG. 15. The optimum amount was determined to be 2 mL/g support. Based on this finding, 1.7875 g of the catalyst support, comminuted to a 80-120 mesh size, is heated in 3.5 mL of a 0.08 M malic acid/ethanol solution (2 ml/g) at 50° C. for 15 minutes. The catalyst support is then washed thoroughly with ethanol, until the pH is greater than 4. After the rinse, the catalyst is dried and immersed in 3.3605 of a 1.33% Platinum solution by weight for 2 hours at room temperature. The Platinum solution consists of 2.5896 g tetraammineplatinum nitrate, 1% by weight ammonia hydroxide and 15% by weight isopropanol (the balance is de-ionized water). The support is then filtered through a 10 μm Teflon® membrane filter and vacuum-dried overnight (15 hours) at 70° C. The loaded catalyst was then calcined at 380° C. in static air for 4 hours, with a heating ramp of 2° C./min. ICP results confirmed a loading of 2.18% Platinum, thus showing that molybdenum-doped ceria-zirconia nanopowders can achieve precise platinum loadings implementing this invention.

COMPARATIVE EXAMPLE 37

The following example demonstrates platinum loading of a support with identical composition to that in Example 34 but not following the procedure described in this invention. 4.4586g of a $Ce_{0.70}Zr_{0.20}Mo_{0.10}O_2$ catalyst support (UR76) was synthesized according to the method described in Example 6, providing for different compositions. The resulting material, comminuted to a 60-200 mesh size, calcined at 400° C. in static air, and with a surface area of 191 m²/g, was submerged in 22.5 mL of a 0.53 M malic acid/ethanol solution for 3 hours at 50° C. The catalyst support was then washed thoroughly with ethanol, until the pH was greater than 4. After the rinse, the catalyst was dried and immersed in 17.3292 g of a 1.04% Platinum solution by weight for 2 hours at room temperature. The Platinum solution consisted of 1.4513 g tetraammineplatinum nitrate, 1% by weight ammonia hydroxide and 15% by weight isopropanol (the balance is de-ionized water). The support was then filtered through a 10 μm Teflon® membrane filter and vacuum-dried overnight (15 hours) at 70° C. The loaded catalyst was then calcined at 400° C. in static air for 4 hours, with a heating ramp of 2° C./min. ICP results confirmed a loading of 2.97% Platinum, thus showing that the optimized surface treatment is needed to achieve precise Platinum loadings.

Although the catalytic activity afforded by Pt is relatively high and effective for many processes, it has been discovered that the addition of rhenium (Re) with the loading of the noble metal (e.g., Pt) on the mixed-metal oxide support yields a water gas shift and/or PROX catalyst of particularly high activity. The turnover rate (TOR—the rate per second at which Moles of CO are converted per Mole of Pt) is significantly greater for such catalysts that include Re relative to those that have Pt without Re. The Re is loaded, to a concentration in the range of 0.5 to 6.0 wt %, on the mixed metal oxide support previously loaded with the catalyst noble metal.

An aspect of the invention provides a preferred process for loading the Re on to the noble metal-loaded mixed-metal oxide. The source of the Re is not particularly critical, and may include ammonium perrhenate ($NH_4ReO_4$), perrhenic acid ($HReO_4$), rhenium carbonyl ($Re_2(CO)_{10}$), or the like, with either of the first two mentioned examples having a cost advantage. The noble metal-loaded nanocrystalline mixed-metal oxide of the invention is immersed in an appropriate solvent; water or a water containing mixture, is an excellent solvent for the ammonium perrhenate ($NH_4ReO_4$) or perrhenic acid ($HReO_4$), while an organic solvent like tetrahydrofuran is an excellent solvent for rhenium carbonyl ($Re_2(CO)_{10}$) in this application. After an optional degassing or inert gas purging step, the noble metal-loaded, preferably Pt-loaded, nanocrystalline mixed metal oxide is contacted with a hydrogen containing gas to reduce and/or remove chemisorbed oxygen from the surface of the noble metal. Separately, the Re source material in the amount sufficient to add the desired amount of Re to the noble metal-loaded nanocrystalline mixed-metal oxide is combined with the solvent to form a solution. This solution then replaces, or is added to, the solvent contacting the solid such that the noble metal-loaded mixed-metal oxide is contacted with the Re source-containing solution. Contact with the hydrogen-containing gas is continued to reduce the perrhenate ion, which in turn results in a close association of the Re with the Pt. If rhenium carbonyl is used, the interaction with the noble metal under hydrogen is believed to result in the decomposition of the rhenium carbonyl, thus depositing Re on the noble metal. As one skilled in the art will recognize, the rhenium carbonyl can be replaced with another reasonably labile rhenium compound/complex or an organometallic rhenium compound free of known or suspected elements deleterious to the catalyst. The mixture is stirred under the $H_2$ flow for a period, followed by a switch to an inert gas. After the hydrogen gas is substantially removed, oxygen or air may be gradually introduced to the inert gas with care being taken that the temperature is maintained below 50° C., preferably below about 30° C. It is also preferable to remove all, or nearly all, of any flammable solvent before the oxygen is introduced. This passivation step is important to prevent pyrophoric ignition upon contact with air, and may be accomplished using alternative equivalent passivation techniques.

EXAMPLE 38

The following is an example demonstrating the method for loading rhenium (Re) on to ceria-zirconia nanocrystalline support material already loaded with platinum, as described in this invention. A known amount of a very high surface area, large pore ceria-zirconia mixed-metal oxide, previously loaded with a nominal 2 weight percent of highly dispersed platinum as according to the invention, is diluted in a solution of degassed tetrahydrofuran (THF). This slurry is then bubbled with a dilute hydrogen stream (3% in argon) until the platinum is sufficiently reduced. With the system under a positive flow of a nominal 3% $H_2$ stream (in Argon), a solution of rhenium carbonyl in degassed THF is added via a needle syringe. The mixture is then stirred at room temperature, still under a positive $H_2$ flow, until the THF evaporates. After the THF has completely evolved, the gas is switched to a dilute oxygen stream (5% in Argon) to (a) drive off the excess THF, and (b) to passivate the surface of the solid, thereby preventing any pyrophoric ignition upon contact with air. This or an equivalent passivation step is necessary for success. Mild heat may be applied to aid in the driving off of the THF. The dilute oxygen gas is left to flow over the powder until it reaches dry, yet pasty consistency. If necessary, at this stage the sample is then placed in a vacuum oven at 70° C. to dry the powder to completion.

EXAMPLE 39

The following is an example demonstrating how the platinum loaded ceria-zirconia nanocrystalline material, when prepared according to the invention, undergoes a low temperature reduction due to the small crystallite size of the ceria-zirconia oxide support particles and the high dispersion of the platinum on these particles. A $Ce_{0.58}Zr_{0.42}O_2$ catalyst support (Sample FF4) was prepared according to Example 1 providing for different composition. After preparation, the support was calcined at 400° C. under static conditions for 4 hours with a heating rate of 10° C./min. The resulting surface area of the support is 178 m²/g and the average crystallite size is 34.3 Å (3.43 nm). After calcination, the support was comminuted to 8-120 mesh, loaded with a nominal 2 wt % platinum, and calcined again at 400° C. for 4 hours at a heating rate of 2° C./min. The loaded support, hereafter being referred to as the catalyst, was then placed in a Temperature Programmed Reduction (TPR) unit and heated to 400° C. while being exposed to a gas mixture of 10% $H_2$ in nitrogen. The data profile is given in FIG. 16. The reduction peak occurs at 71° C. For micron scale materials, this reduction according to the literature is a surface phenomenon, whereas for the nano-scale materials described here, this reduction encompasses the whole mass. Hence, the nano-scale materials described in the invention reduce at an unexpectedly low temperature, giving implications for increased ease of reducibility and higher reactivity under operating water-gas shift conditions. Thus, this example shows the impact of nano-scale crystallite sizes on the reducibility of the ceria-zirconia materials.

Attention is now turned to a consideration of the catalytic activity of the metal-loaded, ceria-based mixed-metal oxide in water gas shift reactions. As discussed previously, the noble-metal loaded, mixed-metal oxide supported catalyst of the invention is particularly suited for use in water gas shift reactions in hydrocarbon fuel processing systems. In that regard, Table 6 below serves to illustrate the effectiveness, or activity, of a platinum-loaded, ceria-zirconia oxide supported catalyst, formulated and/or made in accordance with the invention, in converting CO and $H_2O$ to $CO_2$ and $H_2$. Table 6 conveys the level of that effectiveness or activity, by tracking, as a function of temperature and time, the quantity (%) of CO entering the catalytic reactor (nominally a constant in the tests) vs. the quantity (%) of CO leaving the reactor. The difference is a measure of the conversion activity, either absolutely or as a percentage, in converting CO (and $H_2O$) to $CO_2$ and $H_2$ in the water gas shift reaction. Catalyst activity is given as (Micromoles of CO per second) per gram of catalyst.

It has been discovered that for a given reformate stream that is a mixture of CO, $CO_2$, $H_2$, $H_2O$ and other gases, where the $H_2O$/CO ratio is less than about 6, that a series of noble metal-loaded nanocrystalline mixed metal oxides have similar CO conversion to $CO_2$ turnover rates over a range of cerium to zirconium or hafnium ratios, but that surprisingly for $H_2O$ to CO ratios between 6-30, keeping all other reactant and product concentrations fixed, differences in WGS activity emerge with differences in cerium-to-zirconium or hafnium ratios. Thus, it has been discovered that the WGS catalyst composition may be "tailored" to maximize its activity for a particular range of feed gas composition, and likewise, that the feed gas composition may be tailored through the addition of water and/or the removal of $CO_2$ and/or $H_2$ to operate in the regime of maximum catalyst activity. Furthermore, this aspect of the invention leads to the use of a catalyst bed where either the cerium-to-zirconium or hafnium ratio changes or the Pt-to-Re ratio changes, or both, along the catalyst bed to optimize performance. In this regard, feed gas, or reformate, compositions may be determined for selected regions along the flow of reformate across a catalyst bed in a WGS reactor, and a respective catalyst composition may then be determined and used for each respective region of the catalyst bed to optimize performance across the bed as a whole.

EXAMPLE 40

The following is an example describing the activity test material, method and apparatus in greater detail. A mixed ceria zirconia oxide was prepared according to this invention. The extrudate was dried and calcined at 400 C. The resulting solid contained 65 atomic % Ce and 35 atomic % Zr on a metals only basis. The solid had a surface area measured by the BET method of 187 $m^2$/g, with a pore volume of 0.29 cm3/g. Thus its average pore diameter was 6.13 nm. Its average crystallite size was 3.4 nm by PXRD. Using a skeletal density of 6.6 g/$cm^3$, its surface area per $cm^3$ skeletal volume was 425 $m^2$/$cm^3$, and its ratio of pore volume, $V_P$, to skeletal volume, $V_S$, i. e., $V_P/V_S$, is 1.93. The extrudate was crushed and sieved to yield a porous granular solid that passed through an 80 mesh sieve and was retained on a 120 mesh sieve. This material was heated in an ethanolic solution of malic acid of 0.07 g/ml, to 50° C. for 3 hours, cooled, and rinsed with ethanol until the pH was >4. After rinsing, the solid was immersed in a 1% tetraammineplatinum (II) nitrate solution of 1% ammonium hydroxide and 15% 2-propanol for 2 hrs. The solid was recovered, dried under vacuum at 70° C. overnight. It was then calcined at 450° C. for 4 hours. The platinum uptake from the tetraammineplatinum (II) nitrate solution is consistent with a platinum loading of 2.34 wt %. Then 0.5704 grams, or 0.50 $cm^3$ by volume, of the 80-120 mesh catalyst loaded with Pt, was uniformly blended with 5.00 $cm^3$, or 9.4395 grams, of +40 mesh Strem Chemical alpha alumina granules and charged into a 0.50" O.D. 316L Stainless Steel reactor tube with 0.049" walls with a 0.402" I.D. equipped with a 0.125" O.D. Axial Thermowell. The net cross sectional area of the reactor was 0.74 $cm^2$. The catalyst charge was separated from the bottom frit by a 5.25" length of 10 mesh alundum granules and a thin wad of borosilicate glass wool. The catalyst and 40 mesh alumina diluent bed together was 3.0" long, and topped with a thin wad of borosilicate glass, above which was loaded about 5" more of 10 mesh alundum granules. As this was a down flow reactor, this 5" top section served to preheat the reaction gas mixture to reaction temperature before it contacted the dilute catalyst. This was confirmed during the initial heating and reduction by the internal, 0.0625" K type thermocouple in the internal, axial thermowell. The 0.5" O.D. reactor tube was placed inside a tight fitting aluminum block to minimize axial temperature gradients, and no axial thermal gradient was found at 320° C. under 20% hydrogen, 80% nitrogen flowing at 2.58 standard liters per minute (SLM). The catalyst, after loading into the reactor tube and the reactor tube secured into the reaction system, was first freed of any adsorbed moisture by heating to 150° C. under high purity nitrogen flowing at 1.46 SLM, then the flow rate was further increase to about 2.15 SLM with the addition of 8% very high purity hydrogen. After 1 minute under 8% hydrogen the temperature was increased step-wise to 240° C. and held for 5 minutes, then increased to 290° C. and held for 5 minutes, then increased to 330° C. and held for 5 minutes. Then the hydrogen concentration was increased to 15%, the flow to 2.2 SLM, and after a 10-minute hold, the $H_2$ was increased further to 30% and the flow to 2.5 SLM. After 10 minutes at 30% $H_2$, and 330° C., the hydrogen concentration was increased to 40% and these conditions were held for 15 minutes. Then the temperature was adjusted to 320° C., the flow to 2.58 SLM and the gas composition to 33% $H_2O$, 33% $H_2$, 5% $CO_2$ and the balance $N_2$. These prerun conditions were held for 10 minutes before the carbon monoxide was introduced. The gas mixture was then adjusted to about 4.9% CO, 33% $H_2O$, 30.4% $H_2$, 10.4% $CO_2$ and the balance $N_2$. The feed gas composition was sampled every 20 minutes for about 60 minutes by means of a gas chromatograph. The resultant $N_2$, $CO_2$ and CO values were then compared to the values obtained at varying temperatures during a 320° C. to 200° C. stepwise down-ramp, during which the aluminum block temperature was held constant (within +/−2° C.) while product gas sampling was conducted at each temperature. When the feed gas composition was changed, as in the interval between 24 hours and 66 hours when the quantity of CO in the feed was changed from 4.9% to 1.5% and back, the feed gas was sampled again to insure that conversion calculations and rate calculations were accurate.

UHP grade compressed gases used in the experiments, $N_2$, Ar, $H_2$, CO and $CO_2$, were combined at ambient conditions in a mixing manifold. De-ionized water was fed to a steam generator that operates at approximately 270° C. The generator was used to produce the steam that was mixed with the other gases (in the steam generator) and sent to the reactors. The composition of the final gas mixture was controlled by Brooks meters for the appropriate gases and a Porter Instruments water meter for the steam flow. The inlet gases into the reactor and the exit gases from the reactor were analyzed using a FID and two TCDs.

In Table 6 below, "Effct T" refers to the effective catalyst temperature calculated as Effct T={[(2×Maximum Catalyst Bed Temperature, ° C.)+Catalyst Exit Temperature, ° C.]/3} as measured by the internal thermocouple. The catalyst exit temperature in all cases was approximately the average of the catalyst inlet temperature and the aluminum block temperature. The "Feed" and "Exit" values for only CO are depicted in Table 6 for conciseness. The Time in hours is calculated from when the catalyst bed heater and initial $N_2$ flow was started. Only very slight deactivation is seen after about the first 24 hours.

TABLE 6

| Hours | Effct T C. | Feed % CO | Exit CO % | Rate/Sec MircoMole gram |
|---|---|---|---|---|
| 6.86 | 329 | 4.9 | 0.57 | 101.6 |
| 8.00 | 318 | 4.9 | 0.51 | 103.1 |
| 9.18 | 307 | 4.9 | 0.44 | 104.7 |
| 10.33 | 296 | 4.9 | 0.49 | 103.6 |
| 11.49 | 285 | 4.9 | 0.69 | 98.9 |
| 12.65 | 274 | 4.9 | 1.30 | 84.4 |
| 13.86 | 264 | 4.9 | 2.06 | 66.9 |
| 15.05 | 253 | 4.9 | 2.69 | 52.1 |
| 16.33 | 242 | 4.9 | 3.30 | 37.9 |
| 17.57 | 232 | 4.9 | 3.75 | 27.3 |
| 18.80 | 222 | 4.9 | 4.11 | 18.7 |
| 20.03 | 212 | 4.9 | 4.36 | 12.9 |
| 21.27 | 202 | 4.9 | 4.54 | 8.8 |
| 24.02 | 307 | 4.9 | 0.46 | 104.2 |
| 33.77 | 252 | 1.5 | 0.05 | 33.8 |
| 35.64 | 243 | 1.5 | 0.08 | 33.1 |
| 36.85 | 232 | 1.5 | 0.24 | 29.5 |
| 38.07 | 223 | 1.5 | 0.46 | 24.2 |
| 39.33 | 213 | 1.5 | 0.73 | 17.9 |
| 40.58 | 203 | 1.5 | 0.95 | 12.8 |
| 66.15 | 233 | 4.9 | 3.96 | 22.4 |
| 67.63 | 306 | 4.9 | 0.54 | 102.3 |
| 82.78 | 306 | 4.9 | 0.55 | 102.3 |
| 109.89 | 306 | 4.9 | 0.60 | 100.9 |
| 112.00 | 274 | 4.9 | 1.76 | 74.0 |
| 141.99 | 305 | 4.9 | 0.62 | 100.4 |
| 143.32 | 273 | 4.9 | 2.02 | 67.7 |
| 161.03 | 287 | 4.9 | 0.54 | 102.3 |
| 162.25 | 304 | 4.9 | 0.65 | 99.7 |
| 164.37 | 273 | 4.9 | 2.03 | 67.4 |
| 165.52 | 231 | 4.9 | 4.02 | 21.0 |

It will be noted from Table 6 that the catalyst is relatively more active at the higher temperatures over the practical range of operating temperatures between about 200° C. and 320° C., as would be anticipated. Moreover, for a feed of 1.5% CO, a relatively greater proportion (%) of the CO is removed at lower temperatures than for the 4.9% feed. Also of importance, a significant degree of catalyst stability is indicated by the fact that its activity at 230° C. at 165 hours is at least 90% of its activity at that temperature at 60 hours.

EXAMPLE 41

The following example demonstrates an optimized Ce:Zr ratio and varying water gas shift catalytic activities under different gas conditions. Table 7 compares catalysts UR129, UR176A1, FF4, and UR68, and it is seen that sample FF4, which has a 58:42 Ce:Zr ratio, provides the best Turn Over Rate (TOR) performance under the second set of conditions (TOR$^2$). The optimal Ce/Zr ratio, as reflected by the data in Table 7, is therefore seen to be in the region of 50:50, with good results being seen within the range from 60:40 to 40:60.

TABLE 7

Impact of operating conditions on water gas shift catalytic activity at 240° C.

| Catalyst | Ce | Zr | Pt wt % | TOR$^1$/s$^{-1}$ | TOR$^2$/s$^{-1}$ |
|---|---|---|---|---|---|
| UR129 | 25 | 75 | 1.91 | 0.12 | 0.17 |
| UR176A1 | 50 | 50 | 2.25 | 0.16 | 0.20 |
| FF4 | 58 | 42 | 2.20 | 0.16 | 0.25 |
| UR68 | 65 | 35 | 1.68 | 0.14 | 0.15 |

$^1$4.9% CO, 33% $H_2O$, 30.3% $H_2$, 10.5% $CO_2$
$^2$1.5% CO, 45% $H_2O$, 25% $H_2$, 5% $CO_2$

EXAMPLE 42

The following example demonstrates the water gas shift catalytic activity of two ceria-hafnia catalysts. Sample UR174 is a Pt loaded $Ce_{0.65}Hf_{0.35}O_2$ catalyst prepared using the method described in Example 9. Catalyst UR149 is Pt loaded $Ce_{0.65}Hf_{0.35}O_2$ catalyst where a different batch of $HfO(NO_3)_2 \cdot 5H_2O$ was used in the synthesis. Table 8 compares Catalysts UR174, UR149 and UR68 and it is observed that Hf is a better dopant under the second set of conditions but that the performance of the ceria-hafnia catalysts are batch dependent.

TABLE 8

Impact of Hafnia on water gas shift catalytic activity at 240° C.

| Catalyst | Oxide Composition | Pt wt % | TOR$^1$/s$^{-1}$ | TOR$^2$/s$^{-1}$ |
|---|---|---|---|---|
| UR68 | $Ce_{0.65}Zr_{0.35}O_2$ | 1.68 | 0.14 | 0.15 |
| UR174 | $Ce_{0.65}Hf_{0.35}O_2$ | 2.69 | 0.13 | 0.19 |
| UR149 | $Ce_{0.65}Hf_{0.35}O_2$ | 2.08 | 0.19 | 0.22 |

$^1$4.9% CO, 33% $H_2O$, 30.3% $H_2$, 10.5% $CO_2$
$^2$1.5% CO, 45% $H_2O$, 25% $H_2$, 5% $CO_2$

EXAMPLE 43

The following example demonstrates the impact of platinum loading amount on water gas shift catalytic activity. Various catalysts were prepared according to the invention (Samples UR201A, UR201B, and Sample FF4 from Example 27) and are given in Table 9. The data identifies the nominal Pt amount to be between 1-2.2%.

TABLE 9

Impact of Pt loading on water gas shift catalytic activity at 240° C.

| Catalyst | Ce atomic % | Zr atomic % | Pt wt % | TOR$^1$/s$^{-1}$ | TOR$^2$/s$^{-1}$ |
|---|---|---|---|---|---|
| UR201A | 58 | 42 | 0.65 | 0.11 | 0.17 |
| UR201B | 58 | 42 | 1.12 | 0.17 | 0.22 |
| FF4 | 58 | 42 | 2.16 | 0.16 | 0.25 |

$^1$4.9% CO, 33% $H_2O$, 30.3% $H_2$, 10.5% $CO_2$

EXAMPLE 44

The following example demonstrates the effect of various noble metals on water gas shift catalytic activity. Sample UR201A was prepared and loaded with platinum (Pt) as according to the invention. Sample UR201H was prepared and loaded with palladium (Pd) as according to the invention. Sample UR205C was prepared and loaded with ruthenium (Ru) as according to the invention. Sample UR205D was prepared and loaded with rhodium (Rh) as according to the invention. Catalyst UR205E was prepared and loaded with iridium (Ir) as according to the invention. Clearly, the water gas shift catalytic activity is maximized under the first set of conditions when using Pt as shown in Table 10.

TABLE 10

Impact of noble metals on catalyst performance at 240° C.

| Catalyst | Oxide Composition | Noble metal (%) | TOR[1]/s$^{-1}$ |
|---|---|---|---|
| UR201A | $Ce_{0.58}Zr_{0.42}O_2$ | Pt (0.65) | 0.11 |
| UR201H | $Ce_{0.58}Zr_{0.42}O_2$ | Pd (0.67) | 0.01 |
| UR205C | $Ce_{0.58}Zr_{0.42}O_2$ | Ru (0.72) | 0.01 |
| UR205D | $Ce_{0.58}Zr_{0.42}O_2$ | Rh (0.88) | 0.02 |
| UR205E | $Ce_{0.58}Zr_{0.42}O_2$ | Ir (0.59) | 0.005 |

[1]4.9% CO, 33% $H_2O$, 30.3% $H_2$, 10.5% $CO_2$

EXAMPLE 45

The following example demonstrates the kinetic parameters for two platinum loaded ceria-zirconia catalyst samples. Table 11 compares the steady-state kinetics for Sample UR129 ($Pt/Ce_{0.25}Zr_{0.75}O_2$) and FF4 ($Pt/Ce_{0.58}Zr_{0.42}O_2$) that were prepared according to the invention. The experimental set up is identical to that described in Example 40. The parameters were fit to a simple model given by:

$$\text{Rate} = A^*\exp(-Ea/RT)^*[CO]^{a*}[H_2O]^{b*}[CO_2]^{c*}[H_2]^{d*}(1-\beta) \quad (1)$$

where $\beta = ([CO_2]^*[H_2])/(K^*[CO]^*[H_2O])$ is the approach to equilibrium
A=Pre-exponential
Ea=Activation energy
T=Temperature
a=CO reaction order
b=$H_2O$ reaction order
C=$CO_2$ reaction order
d=$H_2$ reaction order

TABLE 11

Kinetic Parameters for Catalysts between 240° C.-210° C.

| Parameter | UR129 | FF4 |
|---|---|---|
| CO | 0.07 | 0.08 |
| $H_2O$ | 0.60 | 0.65 |
| $CO_2$ | −0.17 | −0.15 |
| $H_2$ | −0.68 | −0.54 |
| Ea/kcal mol$^{-1}$ | 17 | 18 |
| A | 4 * 10$^7$ | 7 * 10$^7$ |
| $R^2$ | 0.97 | 0.97 |

The results indicate that the $H_2$ order for Sample FF4 is greater than the order for Sample UR129. This explains the larger water gas shift catalytic activity for Sample FF4 compared to Sample UR129.

EXAMPLE 46

The following is an example demonstrating the effect of rhenium (Re) loading on the water gas shift catalytic activity of a ceria-zirconia nanocrystalline support material already loaded with platinum, as described in this invention. A platinum-loaded ceria-zirconia catalyst (Sample UR22A), prepared in accordance with the invention, was further loaded with rhenium as described in Example 38. Table 12 gives the turnover rates for this sample and compares it to a platinum-only loaded ceria-zirconia catalyst (Sample UR68). Clearly the addition of rhenium provides an enhancement to the water gas shift catalytic activity.

TABLE 12

Turnover Rate Comparisons Under 1.5% CO, 45% $H_2O$, 5% Co2, 25% H2 and a Total Flow Rate of 2.6 L/min.

| Catalyst | Moles CO/Moles Pt/Sec |
|---|---|
| $Re/Pt/Ce_{0.58}Zr_{0.42}O_2$ | 0.325 |
| $Pt/Ce_{0.65}Zr_{0.35}O_2$ | 0.150 |

EXAMPLE 47

The following example demonstrates the impact of rhenium source on the water gas shift catalytic activity. Various catalysts were prepared in accordance with the invention (Samples UR235B, UR235C, UR235D) with constant Ce:Zr ratios, loaded with platinum as according to the invention, and then subsequently loaded with equal amounts of Re from different rhenium sources (nominally 3 weight percent) as described in Example 38. The rhenium source was rhenium carbonyl [$Re_2(CO)_{10}$] for Sample UR235B, perrhenic acid [$HReO_4$] for Sample UR235C and ammonium perrhenate [$NH_4ReO_4$] for Sample UR235D. The catalysts were tested in the experimental set up described in Example 38. The results are given in Table 13 and compared to Catalyst FF4 that was not loaded with Re. The impact of varying Re sources is seen under two different feed composition at 240° C. The results demonstrate a clear promoter effect of the Re and also suggest no difference in activity when different sources of Re are used.

TABLE 13

Impact of Re and Re sources on catalyst performance at 240° C.

| Catalyst | Ce, atomic % | Zr, atomic % | Pt wt % | TOR[1]/s$^{-1}$ | TOR[2]/s$^{-1}$ |
|---|---|---|---|---|---|
| FF4 | 58 | 42 | 2.16 | 0.16 | 0.25 |
| UR235B | 58 | 42 | 2.03 | 0.20 | 0.29 |
| UR235C | 58 | 42 | 2.03 | 0.24 | 0.27 |
| UR235D | 58 | 42 | 2.03 | 0.22 | 0.28 |

[1]4.9% CO, 33% $H_2O$, 30.3% $H_2$, 10.5% $CO_2$
[2]1.5% CO, 45% $H_2O$, 25% $H_2$, 5% $CO_2$

EXAMPLE 48

The following example demonstrates the impact of proper passivation on water gas shift catalytic performance. Samples UR222A and UR222AB ($Ce_{0.58}Zr_{0.42}O_2$), both Pt loaded according to the invention, were subsequently loaded with rhenium. Sample UR222A was prepared using the proper passivation protocol described in Example 38 while Catalyst UR222AB was prepared according to Example 3 but without the passivation step. The experimental set up was identical to that described in Example 39. The water gas shift catalytic activity results are given in Table 14 and clearly show that under varying feed compositions, Sample UR222A performes better due to proper passivation.

TABLE 14

Impact of Re passivation on catalyst performance at 240° C.

| Catalyst | Ce, at % | Zr, at % | Pt wt % | TOR[1]/ s⁻¹ | TOR[2]/ s⁻¹ | TOR[3]/ s⁻¹ | TOR[4]/ s⁻¹ |
|---|---|---|---|---|---|---|---|
| UR222A | 58 | 42 | 1.83 | 0.20 | 0.32 | 0.22 | 0.15 |
| UR222AB | 58 | 42 | 1.83 | 0.14 | 0.24 | 0.16 | 0.12 |

[1] 4.9% CO, 33% $H_2O$, 30.3% $H_2$, 10.5% $CO_2$
[2] 1.5% CO, 45% $H_2O$, 25% $H_2$, 5% $CO_2$
[3] 2.1% CO, 22% $H_2O$, 11.2% $H_2$, 34.3% $CO_2$
[4] 1.5% CO, 33% $H_2O$, 30.3% $H_2$, 13.9% $CO_2$

EXAMPLE 49

The following example demonstrates the steady-state kinetics for a platinum-only loaded ceria-zirconia catalyst and platinum and rhenium loaded ceria-zirconia catalyst. Samples FF4 and UR235B were prepared and loaded with platinum as described in the invention. Sample UR235B was subsequently loaded with rhenium as described in Example 38. The experimental set up was identical to that described in Example 40. The parameters were fit to a simple model given by:

$$\text{Rate} = A^* \exp(-Ea/RT)^*[CO]^{a*}[H_2O]^{b*}[CO_2]^{c*}[H_2]^{d*}(1-\beta) \quad (1)$$

where $\beta = ([CO_2]^*[H_2])/(K^*[CO]^*[H_2O])$ is the approach to equilibrium
A=Pre-exponential
Ea=Activation energy
T=Temperature
a=CO reaction order
b=$H_2O$ reaction order
c=$CO_2$ reaction order
d=$H_2$ reaction order The results for both catalysts are given in Table 15 and indicate that the positive effect of Re is due to a larger dependency on water with lower inhibitory effects from $CO_2$ and $H_2$.

TABLE 15

Kinetic Parameters for Catalysts between 240° C.-210° C.

| Parameter | FF4 | UR235B |
|---|---|---|
| CO | 0.07 | −0.05 |
| $H_2O$ | 0.67 | 0.85 |
| $CO_2$ | −0.16 | −0.05 |
| $H_2$ | −0.57 | −0.32 |
| Ea/kcal mol⁻¹ | 17 | 17 |
| A | 2.5 * 10⁷ | 4.5 * 10⁶ |
| R² | 0.97 | 0.93 |

EXAMPLE 50

The following example demonstrates the impact of surface area on water gas shift catalytic activity. Sample UR59B ($CeO_2$) was synthesized and loaded with platinum according to the invention and represents a high surface area material. Sample ULSAC3, which represents a low surface area material, was prepared by a method not in accordance with the invention, but Pt loaded according to the invention. The experimental setup for catalytic testing was identical to that described in Example 40. Table 16 demonstrates that with a larger surface area (UR59B), the activity under the first set of conditions is nearly double that of the low surface area sample (ULSAC3).

TABLE 16

Impact of surface area on water gas shift catalytic activity at 240° C.

| Catalyst | Oxide Composition | Pt wt % | Surface area, m² g⁻¹ | TOR[1]/s⁻¹ |
|---|---|---|---|---|
| UR59B | $CeO_2$ | 2.21 | 162 | 0.030 |
| ULSAC3 | $CeO_2$ | 1.00 | 23 | 0.017 |

[1] 4.9% CO, 33% $H_2O$, 30.3% $H_2$, 10.5% $CO_2$

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A catalyst for facilitating a water gas shift reaction, the catalyst comprising a noble metal on a mixed metal oxide, said mixed metal oxide comprising a homogeneous, nanocrystalline, mixed metal oxide of cerium and at least one other metal constituent selected from the group consisting of Zr, Hf, Nb, Ta, La, Pr, Nd, Sm, Eu, Gd, Tb, Dy, Ho, Er, Tm, Yb, Lu, Mo, W, Re, Rh, Sb, Bi, Ti, V, Mn, Co, Cu, Ga, Ca, Sr and Ba, said mixed metal oxide having a surface area of at least about 150 m²/g, an average crystallite size less than 4 nm and agglomerated to form a skeletal structure with pores, average pore diameters being greater than 4 nm and normally being greater than the average crystallite size, and wherein the surface area of the skeletal structure per volume of the mixed metal oxide is greater than about 320 m²/cm³.

2. The catalyst of claim 1 additionally containing Re on the mixed metal oxide with the noble metal.

3. The catalyst of claim 1 wherein the noble metal is platinum.

4. The catalyst of claim 3 additionally containing Re on the mixed metal oxide with the platinum, the Re being in the range of 0.5 to 6.0 wt % of the mixed metal oxide with the platinum.

5. A catalyst for facilitating a water gas shift reaction, the catalyst comprising a noble metal on a mixed metal oxide, said mixed metal oxide comprising a homogeneous, nanocrystalline, mixed metal oxide of cerium and at least one other metal constituent selected from the group consisting of Zr, Hf, Nb, Ta, La, Pr, Nd, Sm, Eu, Gd, Tb, Dy, Ho, Er, Tm, Yb, Lu, Mo, W, Re, Rh, Sb, Bi, Ti, V, Mn, Co, Cu, Ga, Ca, Sr and Ba, said mixed metal oxide having a surface area of at least about 150 m²/g, an average crystallite size less than 4 nm and agglomerated to form a skeletal structure with pores, average pore diameters being greater than 4 nm and normally being greater than the average crystallite size, and wherein the surface area of the skeletal structure per volume of the mixed metal oxide is greater than about 320 m²/cm³, the mixed metal oxide having been prepared by a process including:
  a. dissolving urea and salts of the Ce and the at least one other constituent in water to form a dilute metal salt solution;
  b. heating the solution to near boiling and coprecipitating homogeneously an oxide of the Ce and the at least one other constituent as a nanocrystalline coprecipitate;
  c. replacing water existing in the coprecipitate with a water miscible, low surface-tension solvent that displaces water;

d. drying the coprecipitate to remove substantially all of any remaining water and the solvent; and e. calcining the dried coprecipitate at a moderate temperature for an interval sufficient to remove adsorbed impurities.

6. The catalyst of claim 5 wherein the noble metal is platinum.

7. The catalyst of claim 6 additionally containing Re on the mixed metal oxide with the platinum, the Re being in the range of 0.5 to 6.0 wt % of the mixed metal oxide with the platinum.

8. A catalyst comprising a catalyst metal disposed on a a catalyst support, the catalyst support being a mixed metal oxide comprising a homogeneous, nanocrystalline, mixed metal oxide of cerium and at least one other metal constituent selected from the group consisting of Zr, Hf, Nb, Ta, La, Pr, Nd, Sm, Eu, Gd, Tb, Dy, Ho, Er, Tm, Yb, Lu, Mo, W, Re, Rh, Sb, Bi, Ti, V, Mn, Co, Cu, Ga, Ca, Sr and Ba, said mixed metal oxide having a surface area of at least about 150 $m^2/g$, an average crystallite size less than 4 nm and agglomerated to form a skeletal structure with pores, average pore diameters being greater than 4 nm and normally being greater than the average crystallite size, and wherein the surface area of the skeletal structure per volume of the mixed metal oxide is greater than about 320 $m^2/cm^3$, the catalyst consisting of a highly dispersed metal, including at least a noble metal, loaded on the mixed metal oxide and having a concentration in the range of about 0.1 to about 6.0 percent by weight.

9. The catalyst of claim 8 wherein the noble metal has crystallites that are predominantly less than 2.5 nm.

10. The catalyst of claim 9 wherein the noble metal is platinum.

11. The catalyst of claim 8 additionally including Re loaded on the mixed metal oxide with the noble metal.

12. The catalyst of claim 11 wherein the noble metal is platinum having crystallites that are predominantly less than 2.5 nm in size and the Re is present in an amount in the range of 0.5 to 6.0 wt % of the mixed metal oxide with the platinum.

13. The catalyst of claim 11 wherein the Re on the mixed metal oxide with the noble metal is passivated.

14. A process for the preparation of the catalyst defined in accordance with claim 8, comprising the steps of:

a) contacting the mixed metal oxide with a solution containing an acid selected from the group consisting of amino acids, hydroxy dicarboxylic acids, hydroxy polycarboxylic acids, and keto polycarboxcylic acids to treat the surface of the mixed metal oxide; and b) loading the surface-treated, mixed metal oxide with the noble metal by contacting the surface-treated mixed metal oxide with a solution containing the noble metal to form the catalyst.

15. The process according to claim 14 wherein the acid selected for surface treating the mixed metal oxide is selected from the group consisting of malic acid and citric acid.

16. The process according to claim 14 wherein the noble metal is platinum and the solution is tetraamineplatinum nitrate.

17. The process according to claim 14 wherein
the step a) of surface treating the mixed metal oxide comprises:

i. heating the mixed metal oxide in an acid-containing solution of ethanol and the acid at a mild temperature of about 50° C. for about 2 hours, and ii. rinsing the mixed metal oxide with ethanol until the pH is greater than 4;

the step b) of loading the noble metal on the surface-treated mixed metal oxide comprises:

i. submerging the mixed metal oxide in a solution of tetraamineplatinum nitrate having about 1 weight percent platinum, 1 weight percent ammonia hydroxide and 15 weight percent 2-propanol for about 2 hours at room temperature to metal load the mixed metal oxide and ii. filtering and drying the metal loaded mixed metal oxide;

and including the further step of:

c) calcining the metal loaded mixed metal oxide for up to about four hours at a heating rate of about 2° C./hr to a calcining temperature in the range of about 250°-600° C.

18. The process according to claim 17 wherein the calcining temperature to which the metal-loaded mixed metal oxide is heated is in the range of about 400°-500° C.

19. The process according to claim 14 including the additional preliminary steps of:

a. selecting an acid from said group of acids;

b. titrating a sample solution containing the mixed metal oxide with a titrant solution containing a known concentration of said acid until an equivalence point is determined at which the pH remains substantially unchanged with the further addition of said titrant solution; and c. selecting the amount of acid in the surface treating solution as a function of the quantity of the mixed metal oxide and of said equivalence point determined by said titrating step.

20. A process for the preparation of the catalyst defined in accordance with claim 11, comprising the steps of:

a. surface treating the mixed metal oxide;

b. loading the surface-treated mixed metal oxide with the noble metal;

c. placing the noble metal-loaded mixed metal oxide in a solution;

d. introducing a source of Re in solution to the solution containing the mixed metal oxide with noble metal;

e. reducing, with dilute $H_2$, the Re and noble metal; and f. removing liquid phase of combined solutions to provide the Re and noble metal-loaded mixed metal oxide catalyst.

21. The process of claim 20 including the further step of passivating the surface of the solid Re and noble metal-loaded mixed metal oxide.

22. The process of claim 21 wherein the passivation step comprises flowing a stream of dilute oxygen in inert gas into contact with the solid Re and noble metal-loaded mixed metal oxide.

23. A water gas shift reaction catalyst comprising Re and Pt loaded on to a ceria-based mixed-metal oxide wherein the concentration of Re is in the range of 0.5 to 6.0 wt % and the concentration of Pt is in the range of 0.1 to 6.0 wt % of the ceria-based mixed-metal oxide.

* * * * *